(12) United States Patent
Oya

(10) Patent No.: US 7,872,814 B2
(45) Date of Patent: Jan. 18, 2011

(54) OPTICAL DEVICE, CONTROL METHOD THEREFOR, AND PROGRAM FOR IMPLEMENTING THE CONTROL METHOD

(75) Inventor: Takahiro Oya, Yokohama (JP)

(73) Assignee: Canon Kabushiki Kaisha (JP)

(*) Notice: Subject to any disclaimer, the term of this patent is extended or adjusted under 35 U.S.C. 154(b) by 351 days.

(21) Appl. No.: 12/014,969

(22) Filed: Jan. 16, 2008

(65) Prior Publication Data
US 2008/0174883 A1    Jul. 24, 2008

(30) Foreign Application Priority Data
Jan. 16, 2007    (JP) ............................... 2007-007417

(51) Int. Cl.
*G02B 7/02*    (2006.01)
(52) U.S. Cl. ...................... 359/817; 359/697
(58) Field of Classification Search .................. 359/817, 359/697
See application file for complete search history.

(56) References Cited
U.S. PATENT DOCUMENTS
6,370,332 B1*    4/2002  Kubo ........................... 396/77

2006/0182432 A1*    8/2006  Yumiki ........................ 396/72

FOREIGN PATENT DOCUMENTS
JP    2601425 B2    1/1997
JP    2000-194046 A    7/2000

* cited by examiner

Primary Examiner—Jordan M. Schwartz
Assistant Examiner—James C Jones
(74) Attorney, Agent, or Firm—Rossi, Kimms & McDowell LLP

(57) ABSTRACT

An optical device which makes it possible to reduce time for extending lens units while avoiding collision between lens units during a lens units-extending operation. A first-group barrel is driven by a DC motor. A second-group barrel provided rearward of the first-group barrel on the optical axis is driven by a stepping motor. Photointerrupters detect an intermediate position of the first-group barrel between its retracted position and its shooting position located forward of the retracted position. A control unit controls the DC motor and the stepping motor such that extension of the first-group barrel forward from the retracted position is started, and after the intermediate position is detected by the photointerrupters, extension of the second-group barrel is started.

9 Claims, 20 Drawing Sheets

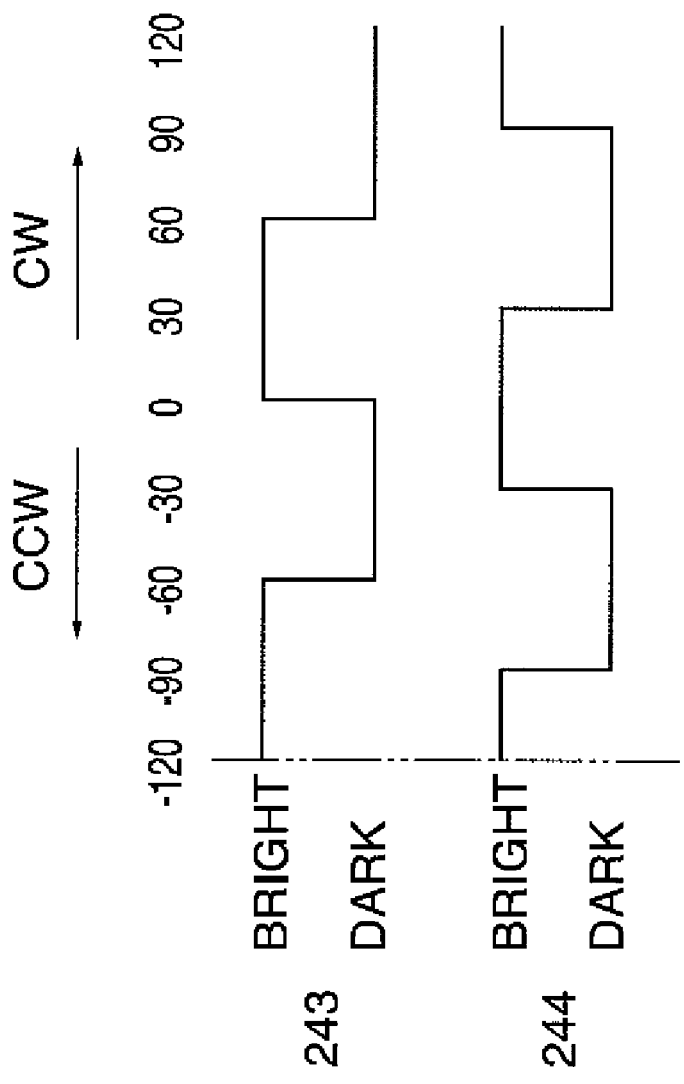
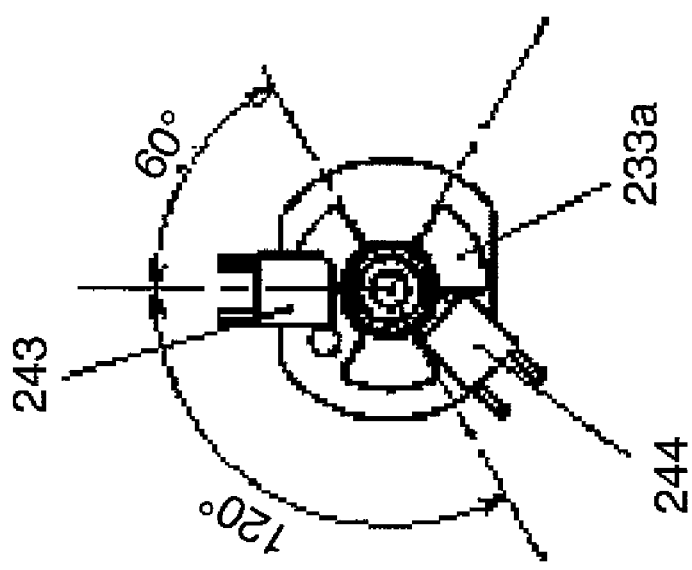

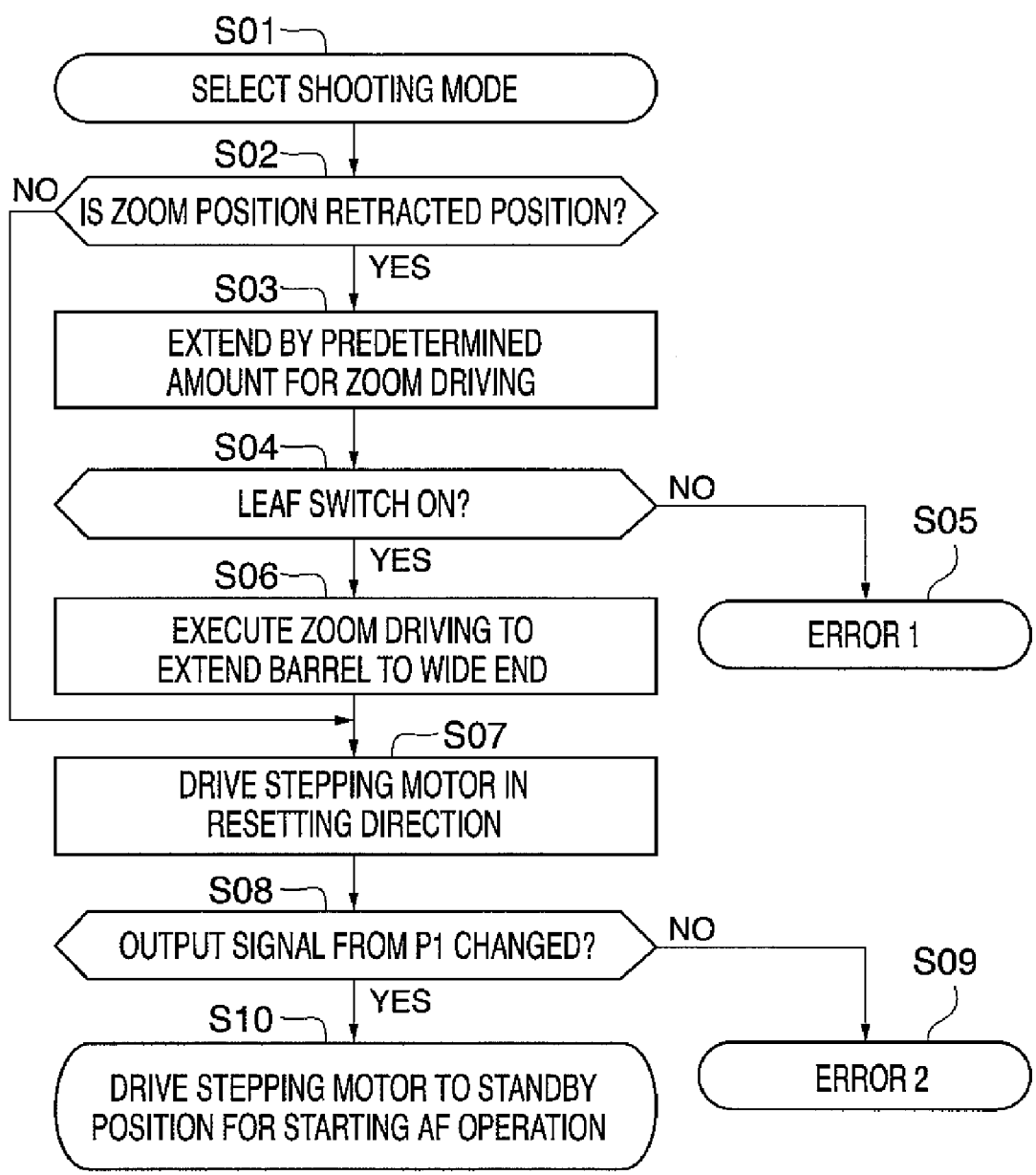

OPTICAL DEVICE, CONTROL METHOD THEREFOR, AND PROGRAM FOR IMPLEMENTING THE CONTROL METHOD

BACKGROUND OF THE INVENTION

1. Field of the Invention

The present invention relates to an optical device having a lens unit movable between a shooting position and a retracted position, a control method therefor, and a program for implementing the method, and more particularly to a technique for controlling extension of the lens unit.

2. Description of the Related Art

Conventionally, an optical apparatus, such as a camera, generally performs a zooming operation and a focus adjusting operation by moving a plurality of lens groups held in respective barrels, i.e. the barrels in an optical axis direction. Further, a camera is known which holds a lens barrel in its retracted state when not shooting by receiving the same in its camera body, and extends the lens barrel to a shooting position when shooting.

In a camera of this type, a variable power lens group is driven e.g. by a DC motor. Torque of the DC motor is transmitted to a drive ring having an inner periphery thereof formed with a cam groove, and the variable power lens group is extended along the cam groove in an optical axis direction.

On the other hand, the focus adjusting operation is performed using e.g. a stepping motor or the like separately provided from the drive motor for the variable power lens group. A camera has also been realized which uses a rear focus lens system disposed rearward of the variable power lens group on the optical axis as a focus adjusting lens. The term 'rearward on the optical axis' is intended to mean a direction opposite to a direction toward an object in front of the cameras i.e. a direction toward the inside of the camera.

Further, a technique has been proposed in which a variable power lens group disposed forward of a focus adjusting lens is retracted into a moving area of the focus adjusting lens (see Japanese Laid-Open Patent Publication (Kokai) No. 2000-194046). This technique is used to reducing distances between lens groups in the retracted state to thereby reduce the size of a camera body.

Next, a conventional operation for extending a barrel from its retracted position will be described with reference to a flowchart in FIG. 19.

When a shooting mode is selected by the user (S01), a control unit (not shown) determines, based on an output from a linear sensor or the like, whether the zoom position of the barrel is in the retracted position or in a shooting-permitting position between a WIDE position to a TELE position (S02). If the zoom position of the barrel is in the shooting-permitting position, the control unit proceeds to a step S07, described hereinafter. On the other hand, if the zoom position of the barrel is in the retracted position, the control unit causes the DC motor to rotate by a predetermined amount in a predetermined direction to thereby perform extension of the barrel holding a variable power lens, i.e. zoom driving operation (S03).

Next, the control unit temporarily stops driving the DC motor for zooming and determines whether or not a leaf switch is in "ON" state (S04). If the leaf switch is in "OFF" state, the control unit judges that an error has occurred, to stop driving of the DC motor for zooming, and executes error handling, such as warning display (S05). If the leaf switch is in "ON" state, the control unit continues the driving of the DC motor for zooming to extend the barrel to the WIDE end (S06).

When extension of the barrel to the WIDE end is completed, the control unit drives the stepping motor to thereby move the focus adjusting lens toward a photointerrupter (S07). Then, the control unit determines whether or not the focus adjusting lens has been detected by the photointerrupter (S08).

If it is determined that the focus adjusting lens has not been detected by the photointerrupter, the control unit judges that an error has occurred, to stop the DC motor and the stepping motor, and executes error handling, such as warning display (S09).

If the focus adjusting lens has been detected by the photointerrupter, the control unit acquires a count-up value of a counter for counting the drive amount of the focus adjusting lens (S10). Then, the control unit drives the stepping motor based on the acquired count-up value of the counter so as to move the focus adjusting lens to a standby position for starting an AF operation (S10). Thereafter, the control unit resets the counter.

As described above, at the start of shooting, extension of the variable power lens group is started prior to extension of the focus adjusting lens. Then, after extension of the variable power lens group to its shooting position is completed, the focus adjusting lens is extended into a space which has become empty by extension of the variable power lens group. Therefore, even when spaces between the lens groups in the retracted position are reduced as mentioned above, it is possible to avoid collision between the variable power lens group and the focus adjusting lens during extension of the lenses.

However, in the prior art described above, since the focus adjusting lens located rearward of the variable power lens group on the optical axis is extended after completion of extension of the variable power lens group, it take longer time to extend the lens barrel before it is in a shooting-permitting position.

To solve this problem, there has been proposed a technique in which extension of the focus adjusting lens is started after the start of extension of the variable power lens group and before the end of the operation (see Japanese Patent No. 2601425).

However, in the technique disclosed in Japanese Patent No. 2601425, when an external force is applied to a camera during extension of the variable power lens group and the extending operation is stopped by the external force, for example, the focus adjusting lens extended from a position rearward of the variable power lens group on the optical axis collides with the variable power lens group.

SUMMARY OF THE INVENTION

The present invention provides an optical device which makes it possible to reduce time for extending lens units while avoiding collision between the lens units during lens units-extending operation, a control method therefor, and a program for implementing the method.

In a first aspect of the present invention, there is provided an optical device comprising a first drive source, a first lens unit configured to be driven by the first drive source, a second drive source, a second lens unit configured to be driven by the second drive source and provided rearward of the first lens unit on an optical axis, a detecting unit configured to detect a reference position between a first reference position of the first lens unit and a second reference position forward of the first reference position, and a control unit configured to control the first and second drive sources such that extension of the first lens unit forward from the first reference position is started, and after the reference position is detected by the detecting unit, extension of the second lens unit is started.

According to the first aspect of the present invention, extension of the first lens unit forward from the first reference position is started, and after the reference position is detected, extension of the second lens unit is started. Therefore, it is possible to reduce time for extending lens units while avoiding collision between the lens units during lens units-extending operation.

Each of the first lens unit and the second lens unit can be movable between a retracted position thereof and a shooting position thereof.

The first reference position can be the retracted position of the first lens unit.

The second reference position can be the shooting position of the first lens unit.

The control unit can extend the second lens unit into a space which has been made empty by extension of the first lens unit therefrom.

The control unit can control the second drive source such that extension of the second lens unit is temporarily stopped after the second lens unit is extended to a predetermined position.

The control unit can control the first and second drive sources such that extension of the second lens unit is restarted after the first lens unit is extended to the second reference position.

In a second aspect of the present invention, there is provided a control method for an optical device having a first lens unit configured to be driven by a first drive source and a second lens unit configured to be driven by a second drive source and provided rearward of the first lens unit on an optical axis, comprising a detecting step of detecting a reference position between a first reference position of the first lens unit and a second reference position forward of the first reference position, and a control step of controlling the first and second drive sources such that extension of the first lens unit forward from the first reference position is started, and after the reference position is detected in the detecting step, extension of the second lens unit is started.

In a third aspect of the present invention, there is provided a control program for causing a computer to execute a control method for an optical device having a first lens unit configured to be driven by a first drive source and a second lens unit configured to be driven by a second drive source and provided rearward of the first lens unit on an optical axis, comprising a detecting module for detecting a reference position between a first reference position of the first lens unit and a second reference position forward of the first reference position, and a control module for controlling the first and second drive sources such that extension of the first lens unit forward from the first reference position is started, and after the reference position is detected by the detecting module, extension of the second lens unit is started.

The features and advantages of the invention will become more apparent from the following detailed description taken in conjunction with the accompanying drawings.

BRIEF DESCRIPTION OF THE DRAWINGS

FIGS. 15A and 15B are a view and a diagram useful in explaining a photointerrupter mounted to a DC motor.

FIG. 19 is a flowchart of an extension process for extending a barrel, which is executed in the prior art.

DETAILED DESCRIPTION OF THE PREFERRED EMBODIMENTS

The present invention will now be described in detail with reference to the drawings showing preferred embodiments thereof.

Figure 1:
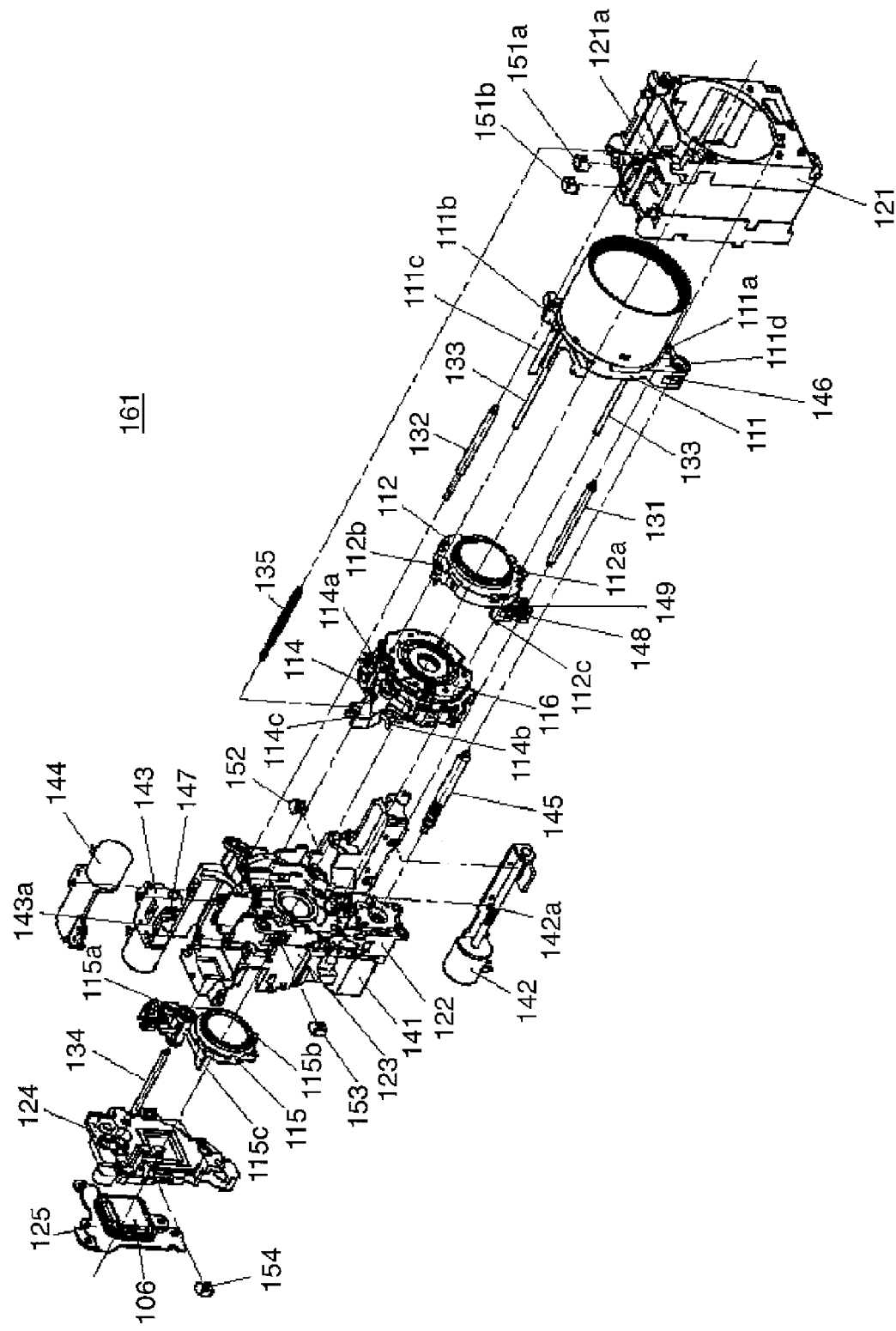
FIG. 1 is an exploded perspective view of a lens barrel (optical device) according to a first embodiment of the present invention.
Figure 2:
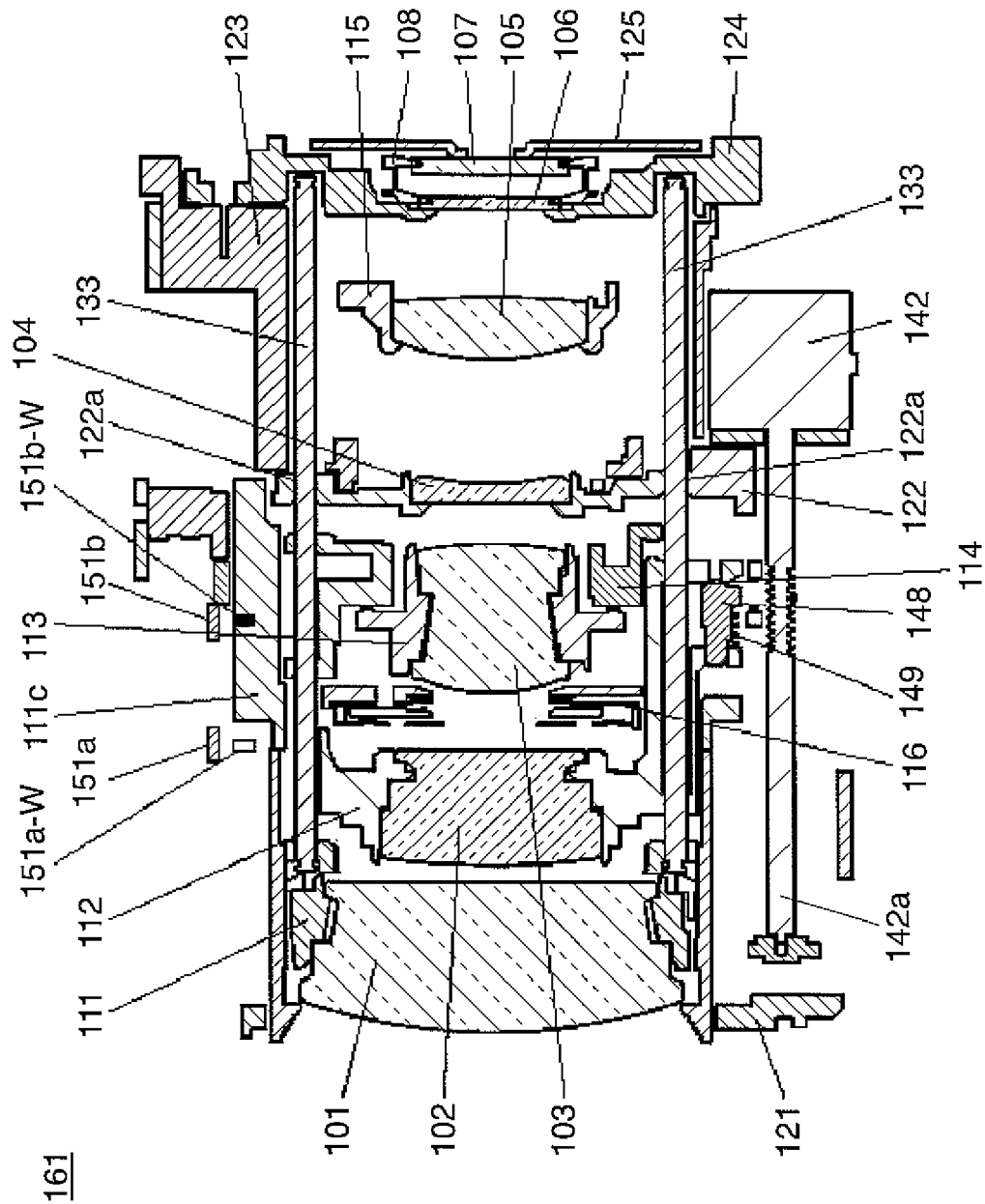
FIG. 2 is a cross-sectional view of the lens barrel in FIG. 1 in an assembled state (retracted position).
Figure 3:
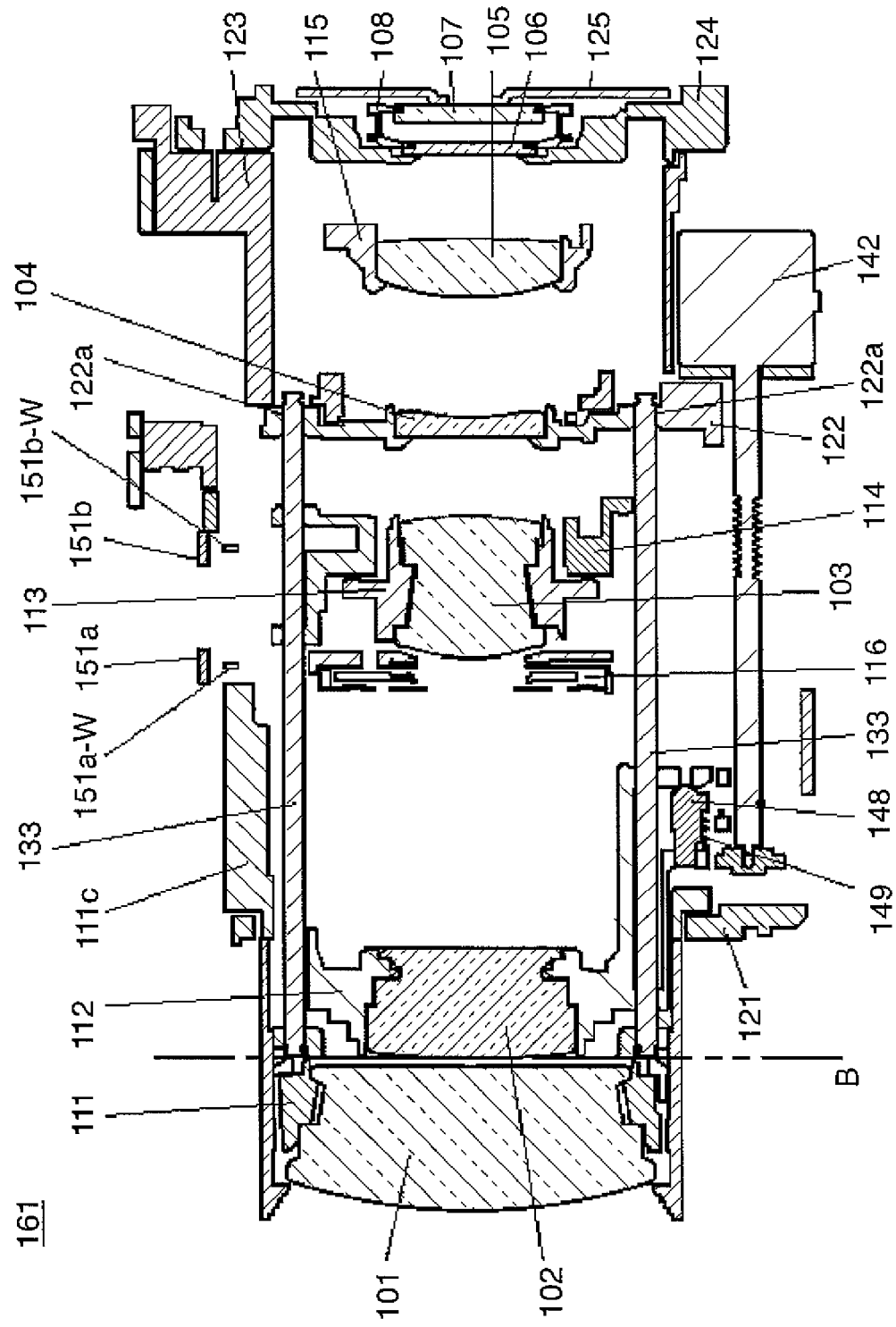
FIG. 3 is a cross-sectional view of the lens barrel in FIG. 1 in the assembled state (WIDE position).

FIG. 1 is an exploded perspective view of a lens barrel according to a first embodiment of the present invention. FIGS. 2 and 3 are cross-sectional views of the lens barrel in FIG. 1 in an assembled state, in which FIG. 2 shows the lens barrel in a retracted state, and FIG. 3 shows the lens barrel in a state extended to the WIDE end. It should be noted that the left-right direction in FIGS. 2 and 3 is reverse to that in FIG. 1.

Referring to FIGS. 2 and 3, reference numerals 101 and 104 designate respective first and fourth lens groups held fixed during a zooming operation. Reference numerals 102 and 103 designate respective second and third lens groups each with variable power. Reference numeral 105 designates a fifth lens group for performing focus adjustment and image plane correction. Reference numeral 106 designates a low-pass filter, 107 a CCD, and 108 a CCD rubber.

In FIGS. 1 to 3, reference numerals 111 and 112 designate respective first-group and second-group barrels for holding the first lens group 101 and the second lens group 102, respectively, such that the lens groups can move in an optical axis direction. Reference numeral 113 designates a third-group barrel for holding the third lens group 103. The third-group barrel 113 is slidable by a known camera shake correction device on a plane perpendicular to the optical axis. The third-group barrel 113 is driven in the optical axis direction in unison with a third-group base plate 114.

The first-group barrel 111 is formed with a shaft hole 111a. A main guide shaft 131 extending in parallel with the optical axis is slidably fitted into the shaft hole 111a. Further, the first-group barrel 111 has a U-shaped detent groove 111b formed at a diametrically opposite location from the shaft hole 111a, i.e. at a location in symmetrical relation to the shaft hole 111a with respect to the optical axis. A sub guide shaft 132 extending in parallel with the optical axis is slidably fitted in the U-shaped detent groove 111b.

The second-group barrel 112 is formed with shaft holes 112a slidably fitted on two second-group and third-group guide shafts 133, and a U-shaped detent groove 112b. Similarly, the third-group base plate 114 is formed with shaft holes 114a slidably fitted on the respective two second-group and third-group guide shafts 133, and a U-shaped detent groove (not shown).

Each of the second-group and third-group guide shafts 133 has one end thereof fixedly secured to the first-group barrel 111, and the other end thereof slidably fitted in a shaft hole 122a formed in a center base 122. Therefore, the second-group and third-group guide shafts 133 reciprocate in unison with the first-group barrel 111.

Reference numeral 135 designates a tension spring for urging the third-group base plate 114 forward (i.e. toward an object). The tension spring 135 is engaged with an engaging part, not shown, of the third-group base plate 114 and a hook 121a formed on a front base 121. A fifth-group barrel 115 is formed with a shaft hole 115a through which a main guide shaft 134 extending in parallel with the optical axis is slidably fitted. Further, the fifth-group barrel 115 has a detent protrusion 115b formed at a diametrically opposite location from the shaft hole 115a, i.e. at a location in symmetrical relation to the shaft hole 115a with respect to the optical axis. The detent protrusion 115b is slidably fitted in a guide groove, not shown, formed on a rear base 123.

Reference numeral 116 designates a known aperture shutter unit. The shutter unit 116 is fixed to the third-group base plate 114, and moves in the optical axis direction in unison with the third-group base plate 114. The fourth lens group 104 is held by the center base 122. The center base 122 is connected to the front base 121 and the rear base 123 with respective predetermined distances therebetween.

Reference numeral 125 designates a CCD plate for holding the CCD 107. The CCD plate 125 is fixed to a CCD holder 124. The CCD holder 124 holds not only the CCD plate 125, but also the low-pass filter 106, and is fixed to the rear base 123. The image pickup surface of the CCD 107 faces a hermetically sealed space formed between the CCD rubber 108 and the CCD holder 124, and is configured to prevent the image of foreign matter, such as dust, from being picked up.

Reference numeral 141 designates a DC motor for driving the first-group barrel 111, and reference numerals 142 and 143 designate stepping motors for driving the second-group barrel 112 and the third-group base plate 114, respectively. The motors 141, 142, and 143 are fixedly screwed to the center base 122. Reference numeral 144 designates a stepping motor for driving the fifth-group barrel 115. The stepping motor 144 is fixedly screwed to the rear base 123. Reference numeral 145 designates a lead screw having a male thread, for reciprocating the first-group barrel 111 in the optical axis direction. The lead screw 145 has a rear end thereof connected to a gear system, not shown, and a front end thereof rotatably fitted in the front base 121.

The main guide shaft 131 of the first-group barrel 111 and the sub guide shaft 132 of the same are fixedly held between the front base 121 and the center base 122. The main guide shaft 134 of the fifth-group barrel 115 is fixedly held between the rear base 123 and the CCD holder 124.

Reference numerals 151a and 151b designate photointerrupters. The photointerrupters 151a and 151b are fixed to the front base 121 with gap parts thereof in parallel with the optical axis. More specifically, each of the photointerrupters 151a and 151b extends in a direction perpendicular to the sheet surface of FIGS. 2 and 3 with a light-emitting unit and a light-receiving unit opposed to each other via the associated gap part.

The first-group barrel 111 is integrally formed with a light shielding plate 111c. The light shielding plate 111c has a thickness in the direction perpendicular to the sheet surface of FIGS. 2 and 3. The light shielding plate 111c moves into or out of the gap parts of the respective photointerrupters 151a and 151b, whereby the state of movement of the first-group barrel 111 is detected.

It should be noted that photointerrupters and light shielding plates, referred to hereinafter, are also mounted in the same manner as the photointerrupters 151a and 151b and the light shielding plate 111c are mounted, described above.

Reference numerals 152 and 153 designate photointerrupters fixed to the center base 122. The second-group barrel 112 is integrally formed with a light shielding plate 112c. Further, the third-group base plate 114 is integrally formed with a light shielding plate 114b. The light shielding plates 112c and 114b are disposed at respective locations which allow the light shielding plates 112c and 114b to move into or out of the gap parts of the respective associated photointerrupters 152 and 153. The light shielding plate 112c moves into or out of a gap part of the photointerrupter 152, whereby the state of movement of the second-group barrel 112 is detected, while the light shielding plate 114b moves into or out of a gap part of the photointerrupter 153, whereby the state of movement of the third-group barrel 113 is detected.

Reference numeral 154 designates a photointerrupter fixed to the rear base 123. The fifth-group barrel 115 is integrally formed with a light shielding plate 115c. The light shielding plate 115c moves into or out of a gap part of the photointerrupter 154, whereby the movement of the fifth-group barrel 115 is detected.

Figure 4:
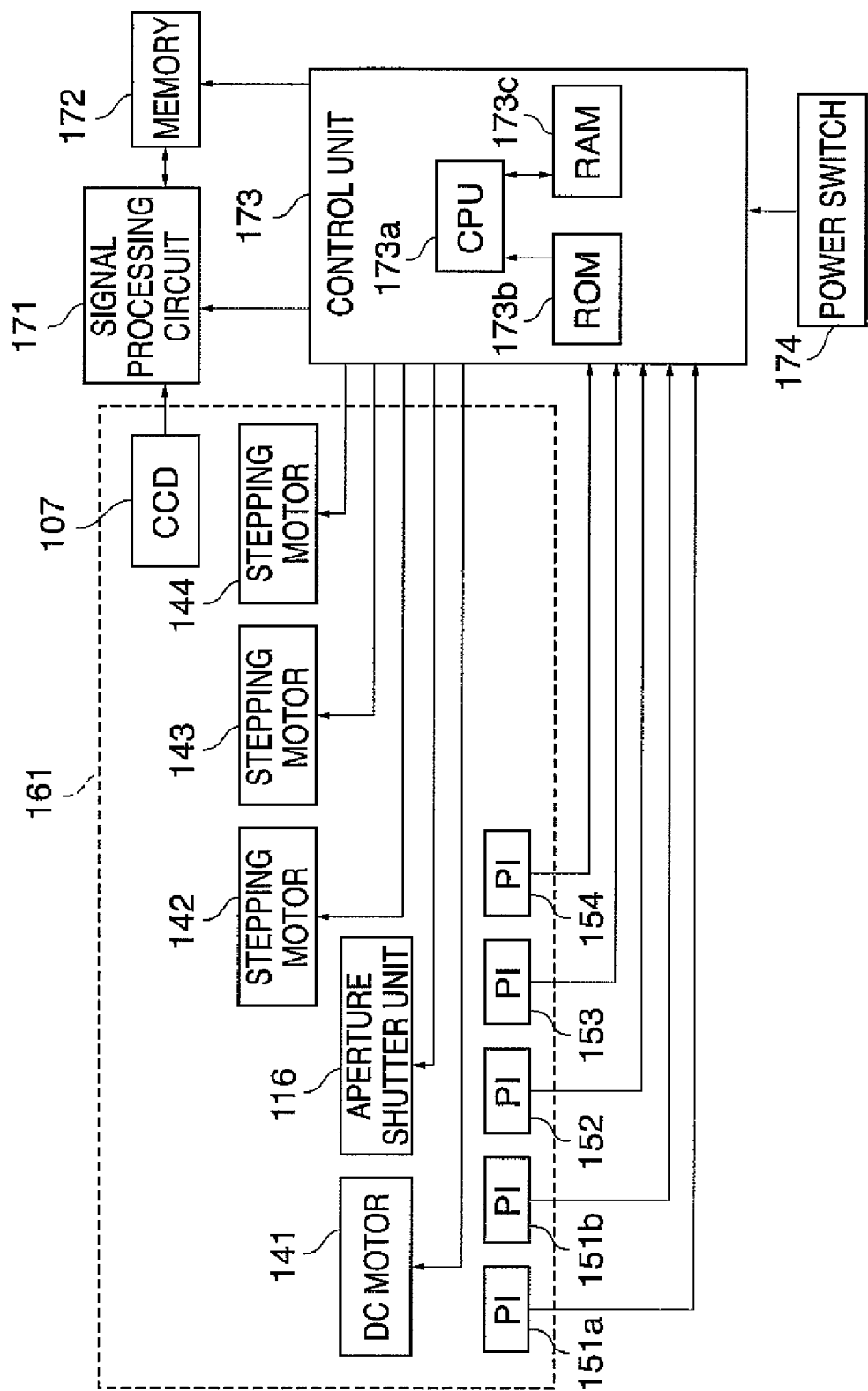
FIG. 4 is a block diagram showing the electrical arrangement of a camera using the lens barrel in FIG. 1.

FIG. 4 is a block diagram showing the electrical arrangement of a camera equipped with the lens barrel in FIGS. 1 to 3. The lens barrel 161 is the same as the lens barrel shown in FIGS. 1 to 3, and therefore component elements included in the lens barrel 161 are designated by the same reference numerals as used in FIGS. 1 to 3.

An image signal obtained through photoelectric conversion by the CCD 107 is subjected to predetermined signal processes, such as color conversion and gamma correction, by a signal processing circuit 171, and is then stored in a memory 172. The memory 172 is implemented by a card-shaped recording medium or the like. A control unit 173 controls the overall operation of the camera. The control unit 173 controls the DC motor 141, the stepping motors 142, 143, and 144, and an aperture shutter unit 116, as required, while monitoring output signals from the respective photointerrupters (PI) 151a, 151b, 152, 153, and 154 of the lens barrel 161. Further, the control unit 173 controls the above-mentioned signal processes and processing for memory access. A power switch 174 is capable of setting the power ON/OFF of the camera.

It should be noted that the control unit 173 is implemented by a microcomputer, and has a CPU 173a, a ROM 173b, and a RAM 173c. The ROM 173b stores various kinds of control programs including one corresponding to a flowchart in FIG. 9. The CPU 173a executes the control programs to thereby control various shooting processes of the present camera. In these control processes, the CPU 173a uses the RAM 173c as a work area and the like.

Next, a description will be given of operation of the lens barrel 161. When the DC motor 141 is driven, torque thereof is transmitted to the lead screw 145 by the gear system, not shown. The first-group barrel 111 has an arm 111d formed with a recess, and a nut 146 is held in the recess. The nut 146 has a female thread to mate with the male thread of the lead screw 145. Rotation of the nut 146 caused by rotation of the lead screw 145 is restricted by the nut 146 fitted on a protrusion, not shown, protruding from the arm 111d. Therefore, as the lead screw 145 rotates, the nut 146 moves in the optical axis direction, and the first-group barrel 111 also moves in the optical axis direction in unison with the nut 146.

At this time, the light shielding plate 111c moves into or from the gap parts of the respective photointerrupters 151a and 151b. Output signals from the photointerrupters 151a and 151b change in accordance with the movement of the light shielding plate 111c. Reference positions within an operation stroke range of the first-group barrel 111 from its retracted position to its shooting position (WIDE position) can be detected by monitoring changes in the output signals from the photointerrupters 151a and 151b. This detecting operation will be described in detail hereinafter.

It should be noted that in the first embodiment, the term "shooting position" is intended to mean a shooting-permitting position within a range between the WIDE end and the TELE end. For example, the shooting-permitting position includes a predetermined position preset in the camera, a position designated by user operation on an as-needed basis, a position determined by pre-photographing processing, such as AE processing or AF processing, and so forth (this applies to the second embodiment).

When the stepping motor 143 is driven, a screw 143a integrally formed with a magnet in the motor rotates. The screw 143a is formed with a male thread to mate with a female thread of a nut 147. The third-group base plate 114 is formed with an arm 114c, and the nut 147 is held in the arm 114c in the same manner as the nut 146 is held in the first-group barrel 111. The nut 147 has its rotation restricted by being fitted on a protrusion, not shown, protruding from the arm 114c. Therefore, as the screw 143a rotates, the nut 147 moves in the optical axis direction, and the third-group barrel 113 also moves in the optical axis direction in unison with the nut 147.

When the stepping motor 142 is driven, a screw 142a integrally formed with the rotating shaft of the motor rotates. The screw 142a is formed with a male thread. The second-group barrel 112 has a rack 148 and a rack spring 149 integrally mounted thereon. Through meshing engagement of the rack 148 with the male thread of the screw 142a, the second-group barrel 112 is actuated in the optical axis direction, whereby a zooming operation is performed. At this time, the rack 148 is kept urged by the rack spring 149 both in the engaging direction and in the optical axis direction, whereby mesh backlash and thrust backlash are eliminated.

The fifth-group barrel 115 is identical in construction to the second-group barrel 112. More specifically, through meshing engagement of a rack 115a on the fifth-group barrel 115 with a screw of the stepping motor 144, the fifth-group barrel 115 is moved in the optical axis direction, whereby focus adjustment is performed.

The light shielding plate 112c moves into or out of the gap part of the photointerrupter 152 within an operation stroke range of the second-group barrel. An output signal from the photointerrupter 152 changes as the light shielding plate 112c moves into or out of the gap part, whereby a counter for the stepping motor 142 is reset.

A similar counter reset operation is performed in accordance with the movement of the third-group base plate 114 and that of the fifth-group barrel 115. More specifically, when the light shielding plates 114b (115c) move into or out of the gap part of the photointerrupter 153 (154), an output signal therefrom changes, and a counter for the stepping motor 143 (144) is reset.

As described above, according to the present embodiment, the barrels of the respective groups are configured to be driven separately from each other, and the control unit 173 controls the operation of each group while monitoring an output signal from an associated photointerrupter.

Figure 5:
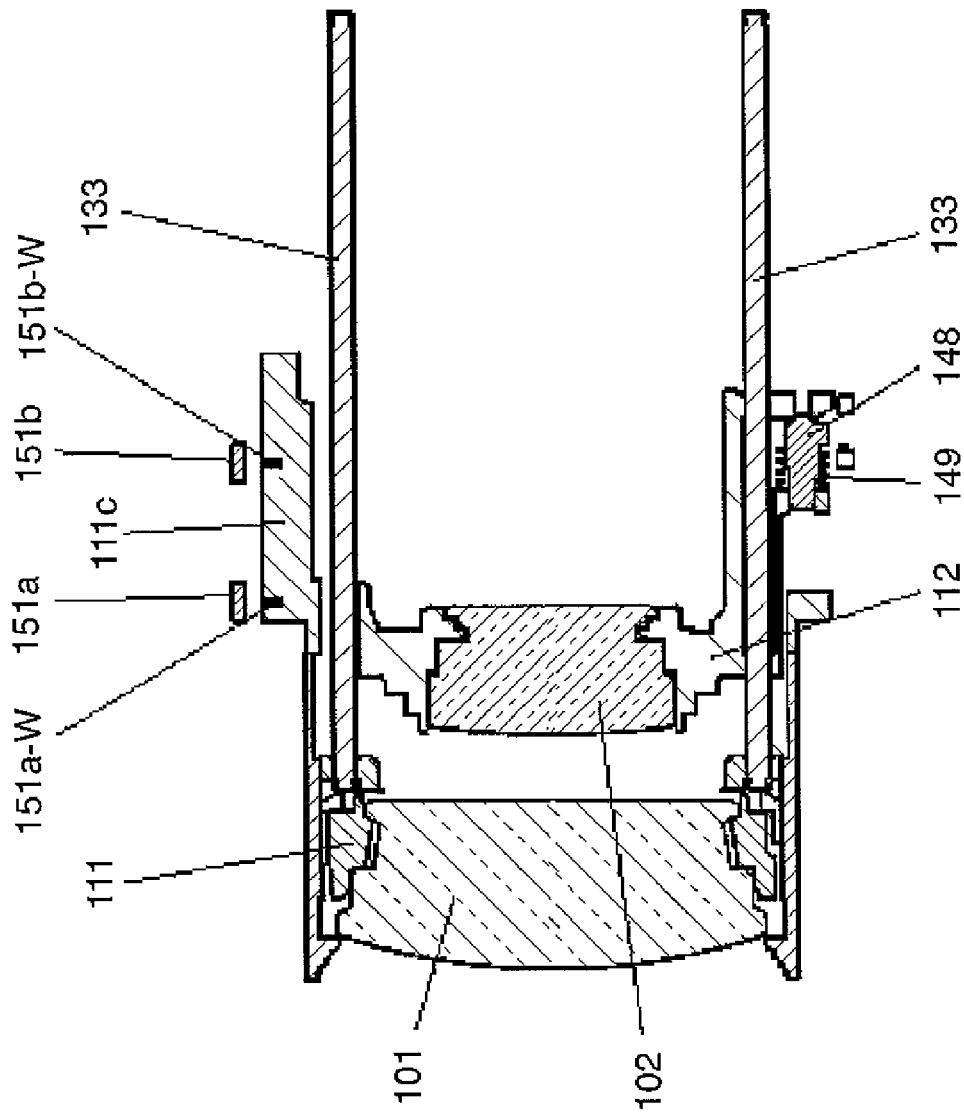
FIG. 5 is a cross-sectional view of the lens barrel in FIG. 1 (immediately after the start of extension of a first-group barrel).
Figure 6:
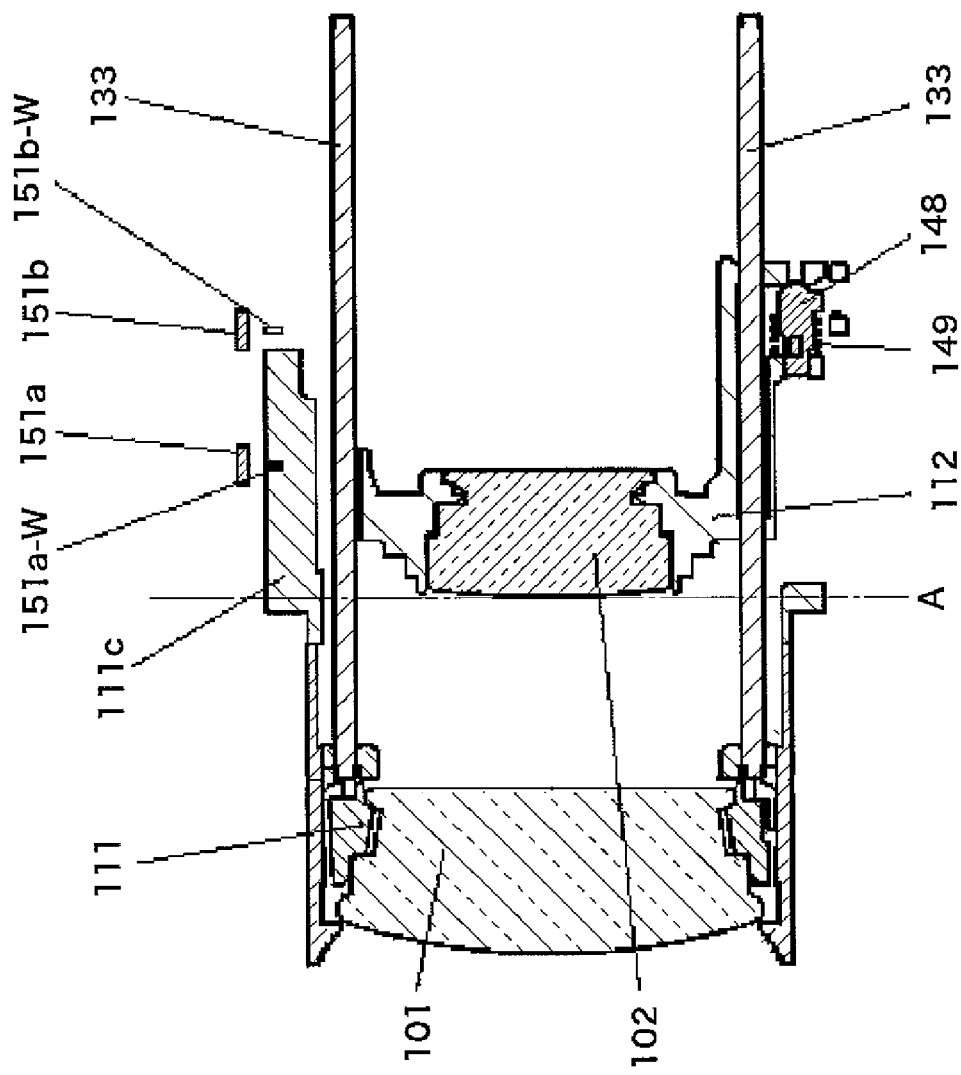
FIG. 6 is a cross-sectional view of the lens barrel in FIG. 1 (during extension of the first-group barrel).

Next, changes in the output signals from the respective photointerrupters 151a and 151b in accordance with extension of the first-group barrel 111 will be described with reference to FIGS. 2, 3, and 5 to 7. FIGS. 5 and 6 are cross-sectional views showing a state of the lens barrel immediately after the start of extension of the first-group barrel 111 and a state of the lens barrel in which the first-group barrel 111 is half extended, respectively. It should be noted that in FIGS. 5 and 6, only peripheral parts of the first-group barrel 111 and the second-group barrel 112, and the photointerrupters 151a and 151b are shown for purposes of ease of understanding.

Reference numerals 151a and 151b-W in FIGS. 2, 3, 5, and 6 designate respective light projection widths of light beams emitted from the light emitting parts (LEDs) of the photointerrupters 351a and 151b. This illustration indicates that in actuality, the light emitting parts of the photointerrupters 151a and 151b extend at least to respective portions designated by the reference numerals 151a-W and 151b-W. The light projection width 151a-W (151b-W) in white shows a state in which the gap part of the photointerrupter 151a (151b) is not shielded by the light shielding plate 111c of the first-group barrel 111. On the other hand, the light projection width 151a-W (151b-W) in black shows a state in which the gap part of the photointerrupter 51a (151b) is shielded by the light shielding plate 111c of the first-group barrel 111.

It should be noted that the meaning of a position indicated by a two-dot chain line "B" in FIG. 3 and that of a position indicated by a two-dot chain line "A" in FIG. 6 will be described hereinafter. The positions "A" and "B" correspond to respective positions "A" and "B" in FIG. 8. Further, each of the photointerrupters has an A/D conversion function, and outputs a binary signal of "H" and "L".

Figure 7:
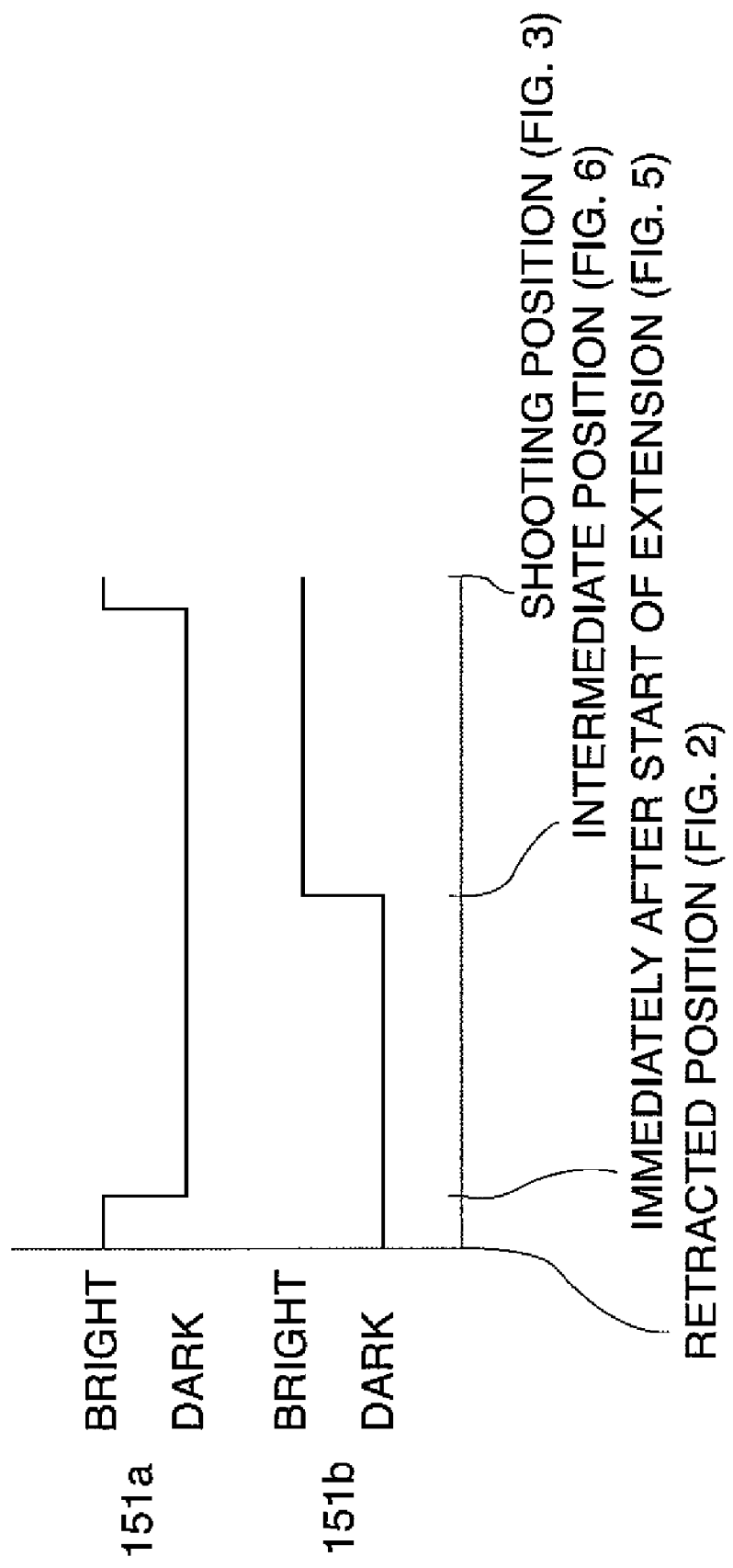
FIG. 7 is a conceptual diagram showing output signals from respective photointerrupters of the first-group barrel.

FIG. 7 is a diagram showing the relationship between the operation stroke of the first-group barrel 111 and the output signals from the respective photointerrupters 151a and 151b. In the retracted position in FIG. 2, the output signal from the photointerrupter 151a is "bright", i.e. "1H" indicative of a non-light-shielded state, and the output signal from the photointerrupter 151b is "dark", i.e. "L" indicative of a light-shielded state.

When the DC motor 141 is driven, the first-group barrel 111 is moved in the optical axis direction as mentioned above, the leading end of the light shielding plate 111c moves into the gap part of the photointerrupter 151a, as shown in FIG. 5, immediately after the start of extension. As a consequence, the output signals from the respective photointerrupters 151a and 151b both indicate "dark: L".

When the first-group barrel 111 is further moved in the optical axis direction and reaches a reference position corresponding to approximately the half of the operation stroke, as shown in FIG. 6, the trailing end of the light shielding plate 111c moves out from the gap part of the photointerrupter 151b. As a consequence, only the output signal from the photointerrupter 151b turns to indicate "bright: H".

Then, immediately before the first-group barrel 111 reaches the shooting position (WIDE position), the trailing end of the light shielding plate 111c moves out of the gap part of the photointerrupter 151a. As a consequence, the output signals from the respective photointerrupters 151a and 151b change such that they both indicate "bright: H".

As described above, according to the present embodiment, it is possible to detect not only the retracted position and shooting position of the first-group barrel 111, but also an intermediate position as the reference position in the operation stroke, based on the output signals from the respective photointerrupters 151a and 151b. The detection of the intermediate position is utilized to avoid collision of the second-group barrel 112 with the rear end of the first-group barrel 111, as described hereinafter.

As is apparent from the retracted position in FIG. 2 and the shooting position in FIG. 3, the second-group barrel 112 is extended into an empty space formed after extension of the first-group barrel 111. This normally prevents collision of the second-group barrel 112 with the rear end of the first-group barrel 111. However, an external force or the like can cause the rear-end collision. In the present embodiment, in order to avoid the rear-end collision of the second-group barrel with the first-group barrel 111 due to an external force or the like, extension of the second-group barrel 112 is inhibited until an extended position of the first-group barrel 111 is detected.

Figure 8:
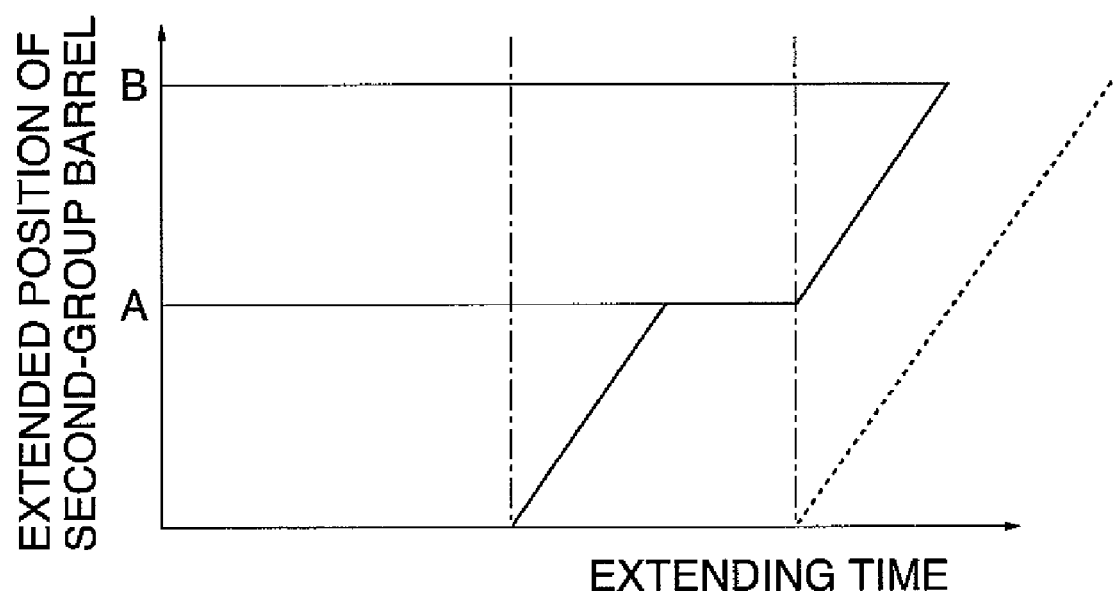
FIG. 8 is a conceptual diagram showing timing for extending a second-group barrel.

More specifically, in the present embodiment, at a time point when the intermediate position of the first-group barrel 111 in FIG. 6 as the reference position halfway through the extension is detected, the second-group barrel 112 starts to be extended to the position "A" in FIGS. 6 and 8, where rear-end collision of the second-group barrel 112 with the first-group barrel 111 cannot occur. Further, at a time point when the first-group barrel 111 is extended to its shooting position as shown in FIG. 3, the second-group barrel 112 starts to be extended to its shooting position, i.e. the position "B" in FIGS. 3 and 8.

It should be noted that since the second-group barrel 112 is driven by the stepping motor 142, the extended position of the second-group barrel 112 is controlled according to the number of drive pulses generated after the light shielding plate 112c having moved out of the gap part of the photointerrupter 152 and the counter having been reset.

It should be noted that in FIG. 8, the abscissa represents extending time, and the ordinate represents the extended position of the second-group barrel 112. In FIG. 8, a broken line indicates a conventional case, and a solid line indicates a case of the present embodiment. More specifically, conventionally, extension of the second-group barrel 112 is started after the shooting position of the first-group barrel 111 is detected, whereas in the present embodiment, extension of the second-group barrel 112 is started after the intermediate position of the first-group barrel 111 is detected. Therefore, the extending time of the second-group barrel 112 in the present embodiment (solid line) is shorter than that in the conventional case (broken line).

Figure 9:
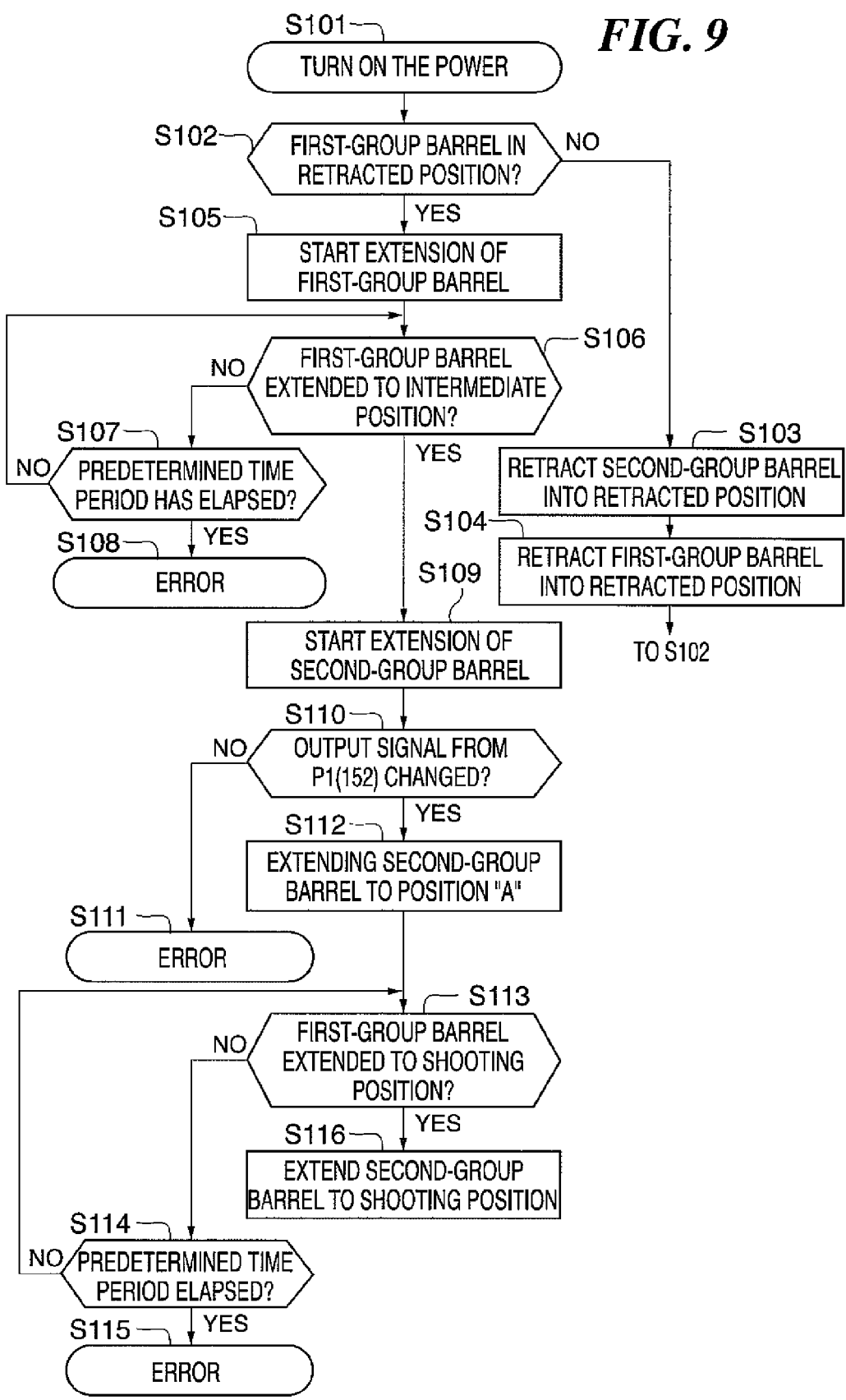
FIG. 9 is a flowchart of a process for extending the first-group barrel and the second-group barrel.

FIG. 9 is a flowchart of a drive process for driving the first-group barrel 111 and the second-group barrel 112. The user operates the power switch 174 to turn on the power (S101). When the power is turned on, the control unit 173 determines, based on the output signals from the photointerrupters 151a and 151b, whether or not the first-group barrel 111 is in the retracted position (S102). If the first-group barrel 111 is not in the retracted position, the control unit 173 drives the stepping motor 142 to thereby retract the second-group barrel 112 into the retracted position (S103). Next, the control unit 173 drives the DC motor 141 to thereby retract the first-group barrel 111 into the retracted position (S104), followed by returning to the step S102.

On the other hand, if the first-group barrel 111 is in the retracted position, the control unit 173 drives the DC motor 141 to thereby start extension of the first-group barrel 111 (S105). Then, the control unit 173 determines, based on the output signals from the photointerrupters 151a and 151b, whether or not the first-group barrel 111 has been extended to the intermediate position (S106). If the first-group barrel 111 has not been extended to the intermediate position, the control unit 173 determines whether or not a predetermined time period has elapsed after the start of the extension of the first-group barrel 111 (S107).

If the predetermined time period has elapsed after the start of the extension of the first-group barrel 111, the control unit 173 judges that an error has occurred, and executes error handling, such as warning display (S108). At this time, the control unit 173 stops driving the DC motor 141 to thereby stop the extension of the first-group barrel 111. On the other hand, if the predetermined time period has not elapsed after the start of the extension of the first-group barrel 111, the control unit 173 returns to the step S106.

If it is determined in the step S106 that the first-group barrel 111 has been extended to the intermediate position, the control unit 173 drives the stepping motor 142 to thereby start extension of the second-group barrel 112 from the retracted position (S109). In the meanwhile, the first-group barrel 111 is also being continuously extended toward the shooting position.

Then, the control unit 173 determines whether or not the output signal from the photointerrupter 152 has changed within a predetermined time period after the start of the extension of the second-group barrel 112 (S110). If it is determined that the output signal from the photointerrupter 152 has not changed within the predetermined time period, the control unit 173 judges that an error has occurred, and executes error handling, such as warning display (S111). At this time, the control unit 173 stops driving the stepping motor 142 and the DC motor 141 to thereby stop the extension of the second-group barrel 112 and that of the first-group barrel 111.

If it is determined in the step S111 that the output signal from the photointerrupter 152 has changed within the predetermined time period, the control unit 173 resets the counter for the stepping motor 142 (S112). Then, the control unit 173 sets in the counter the number of pulses required for extending the second-group barrel 112 to the position "A" in FIGS. 6 and 8, where the rear-end collision of the second-group barrel 112 with the first-group barrel 111 cannot occur (S112). In this case, the control unit 173 applies drive pulses of a number corresponding to the drive pulse count set in the counter to the stepping motor 142 to thereby extend the second-group barrel 112 to the position "A" in FIGS. 6 and 8 (S112).

After extending the second-group barrel 112 to the position "A" in FIGS. 6 and 8, the control unit 173 temporarily stops the operation for extending the second-group barrel 112. Since the first-group barrel 111 is being continuously extended from the intermediate position, the position "A" in FIGS. 6 and 8 can be set at a location forward of the illustrated position. Thus, time required for extending the entire lens barrel 161 can be further shortened. However, in order to completely prevent rear-end collision of the second-group barrel 112 with the first-group barrel 111, it is required to give consideration to extending speeds of the respective first-group and second-group barrels 111 and 112.

Next, the control unit 173 determines whether or not the first-group barrel 111 has been extended to its shooting position (S113). If the first-group barrel 111 has not been extended to its shooting position, the control unit 173 determines whether or not a predetermined time period has elapsed after the start of the extension of the first-group barrel 111 (S114). Of course, the predetermined time period set in this case is longer than that in the step S107.

If the predetermined time period has elapsed after the start of the extension of the first-group barrel 111, the control unit 173 judges that an error has occurred, and executes error handling, such as warning display (S115). At this time, the control unit 173 stops driving the DC motor 141 and the stepping motor 142 to thereby stop the extension of the first-group barrel 111 and that of the second-group barrel 112. On the other hand, if the predetermined time period has not elapsed after the start of the extension of the first-group barrel 111, the control unit 173 returns to the step S113.

If it is determined in the step S113 that the first-group barrel 111 has been extended to its shooting position, the control unit 173 restarts driving the stepping motor 142 to thereby extend the second-group barrel 112 to its shooting position, i.e. the position "B" in FIGS. 3 and 8 (S116). After the extension of the second-group barrel 112 is completed, the control unit 173 awaits a shooting instruction operation by the user, in the shooting-permitting state of the camera.

As described above, according to the first embodiment, the intermediate position of an operation stroke of the first-group barrel 111 is detected during extension of the first-group barrel 111. Then, when the intermediate position is detected, extension of the second-group barrel 112 positioned rearward of the first-group barrel 111 on the optical axis is started, and the second-group barrel 112 is extended to a position where rear-end collision of the second-group barrel 112 with the first-group barrel 111 cannot occur.

This makes it possible to shorten time for extending the lens barrel from the retracted position and prevent rear-end collision of the second-group barrel 112 with the first-group barrel 111 even when the extension of the foremost first-group barrel 111 is stopped e.g. by a disturbance.

Although in the present embodiment, a single position is set as the intermediate position of the first-group barrel 111 to be detected, a plurality of intermediate positions may be detected. In this case, it is possible to further shorten the extending time. Further, a sensor for detecting the intermediate position and the like may be implemented e.g. by a reflective photosensor.

Next, a description will be given of a second embodiment of the present invention. In the first embodiment, the intermediate position is detected as an absolute value by directly detecting the position of the currently extended first-group barrel 111 by the photointerrupters. On the other hand, in the second embodiment, the number of rotations of a DC motor as a drive source commonly used by a first-group barrel and a second-group barrel is monitored, and an intermediate position of the second-group barrel is indirectly detected based on the monitored number of rotations of the DC motor.

Further, in the first embodiment, extension control is performed so as to prevent rear-end collision of the second-group barrel 112 with the first-group barrel 111, whereas in the second embodiment, extension control is performed so as to prevent rear-end collision of a third-group barrel for focus adjusting operation, described hereinafter, with the second-group barrel for a zooming operation. This is because the first-group barrel and the second-group barrel are driven by the same DC motor, and have their movements restricted by respective cam grooves, and hence collision between the two barrels is difficult to think of.

Figure 10:
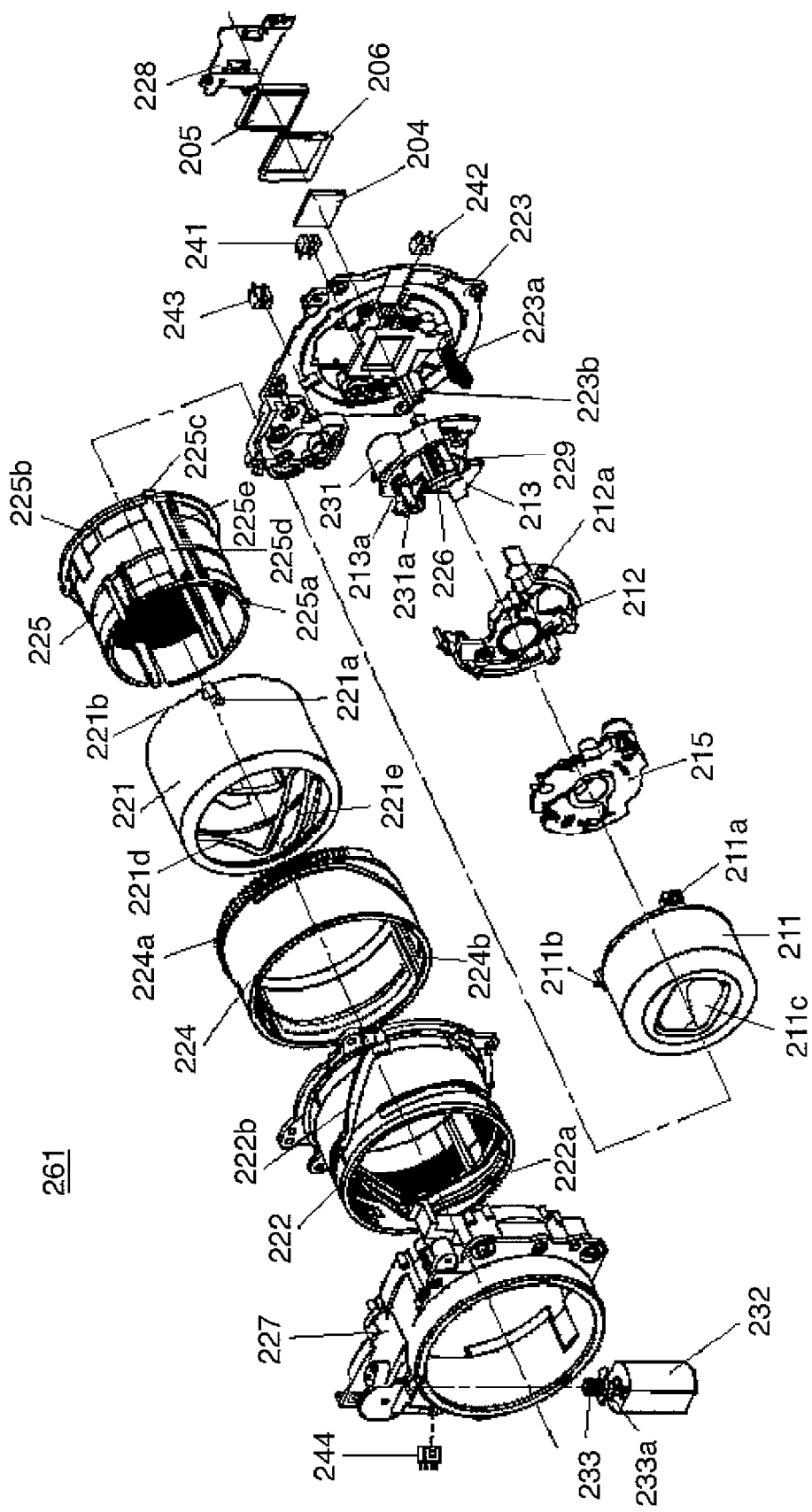
FIG. 10 is an exploded perspective view of a lens barrel (optical device) according to a second embodiment of the present invention.

FIG. 10 is an exploded perspective view of a lens barrel according to the second embodiment of the present invention. Further, FIGS. 11 and 12 are cross-sectional views of the lens barrel in FIG. 10 in an assembled state, in which FIG. 11 shows a retracted state, and FIG. 12 shows a state extended to the WIDE end.

Figure 11:
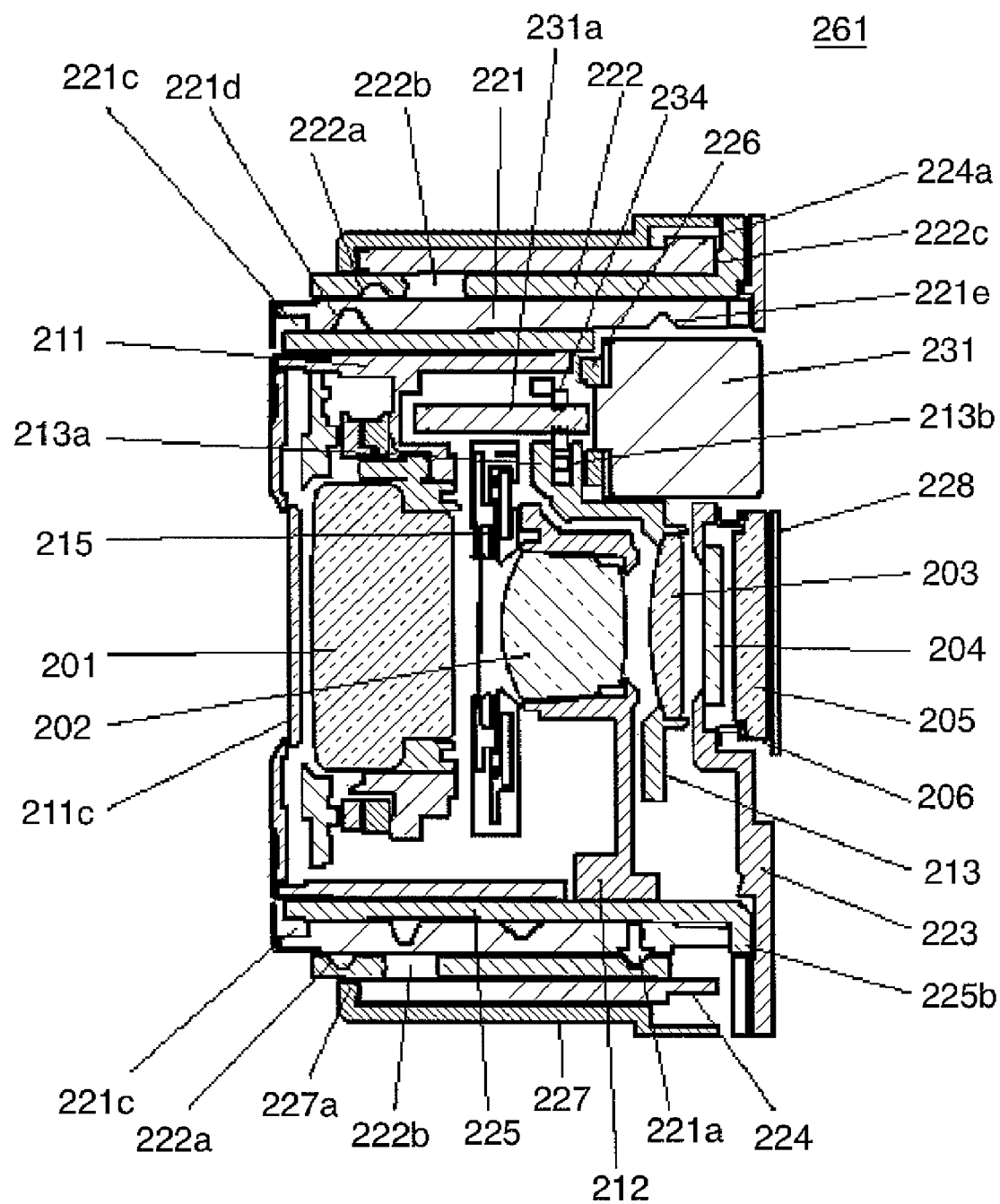
FIG. 11 is a cross-sectional view of the lens barrel in FIG. 10 in an assembled state (retracted position).
Figure 12:
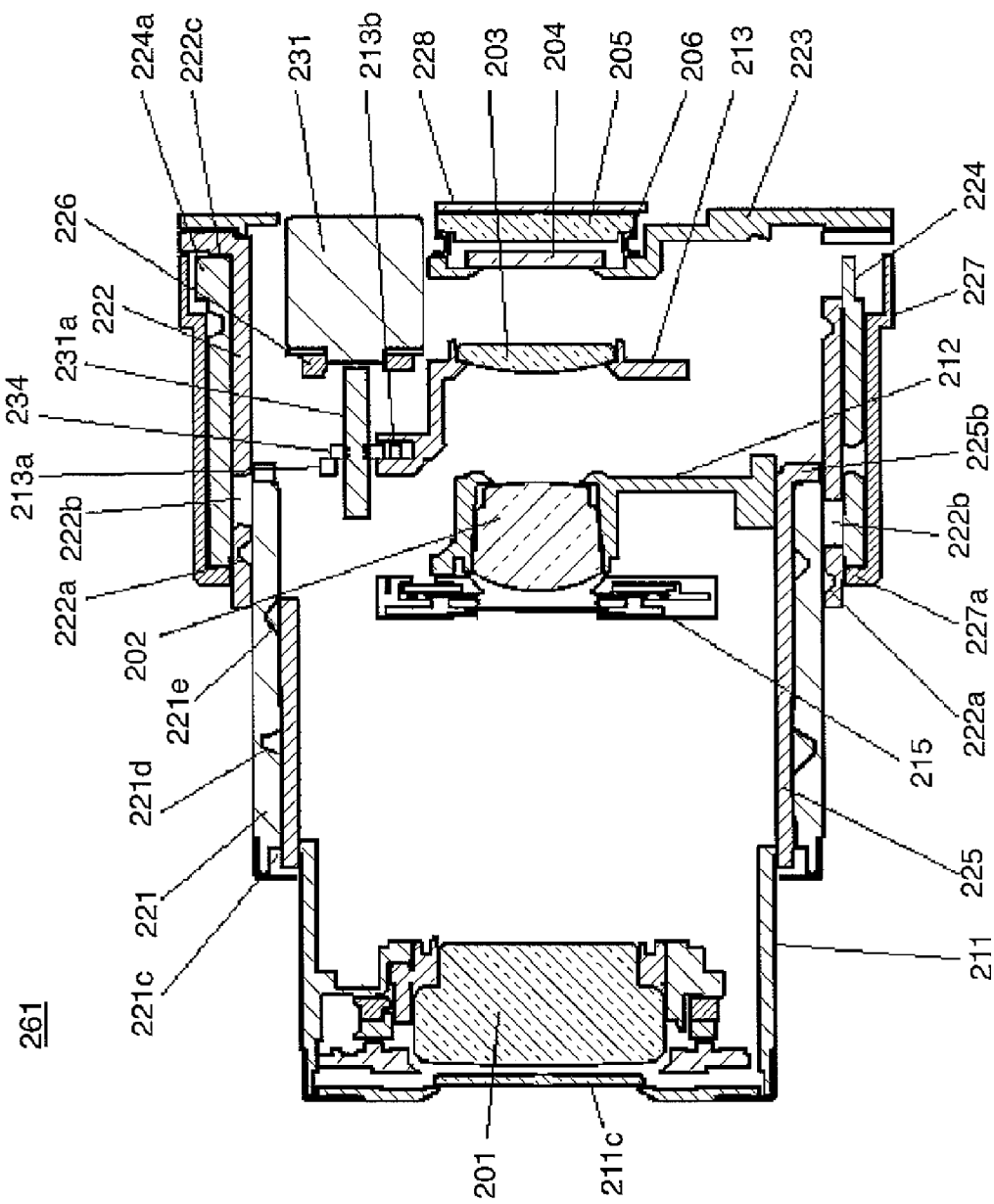
FIG. 12 is a cross-sectional view of the lens barrel in FIG. 10 in the assembled state (WIDE position).

Referring to FIGS. 10 to 12, reference numerals 201 and 202 designate a first lens group and a second lens group each with variable power. Reference numeral 203 designates a third lens group that performs focus adjustment and image plane correction. Reference numeral 204 designates a low-pass filter, 205 a CCD, and 206 a CCD rubber.

Reference numerals 211, 212, and 213 designate the respective first-group, second-group, and third-group barrels for holding the first lens group, the second lens group, and the third lens group, respectively, in a manner movable in the optical axis direction. The first-group barrel 211 and the second-group barrel 212 are held in a movable cam ring 221 having the cam grooves 221d and 221e formed in an inner surface thereof. A follower 211b formed on the first-group barrel 211 and a follower 212a formed on the second-group barrel 212 are in sliding contact with the respective cam grooves 221d and 221e of the movable cam ring 221.

Reference numeral 222 designates a fixed barrel. The fixed barrel 222 movably holds the movable cam ring 221 by a cam groove formed in an inner peripheral surface thereof. Reference numeral 228 designates a CCD plate for holding the CCD 205. The CCD plate 228 is fixed to a CCD holder 223. The CCD holder 223 holds not only the CCD plate 228, but also the low-pass fitter 204, and is fixed to the fixed barrel 222. The image pickup surface of the CCD 205 faces a hermetically sealed space formed between the CCD rubber 206 and the CCD holder 223, and is configured to prevent the image of foreign matter, such as dust, from being picked up.

Reference numeral 224 designates a drive ring for rotating the movable cam ring 221. Reference numeral 225 designates a straight advance guide ring for restricting the rotation of the first-group barrel 211 and that of the second-group barrel 212 to thereby cause the first-group barrel 211 and the second-group barrel 212 to advance straight. Reference numeral 231 designates a stepping motor for driving the third-group barrel 213. The stepping motor 231 is fixed to a third-group cap 226. The third-group cap 226 is fixed to the CCD holder 223. Reference numeral 227 designates a cover barrel. The cover barrel 227 is fixed to the CCD holder 223, and restricts the movement of the drive ring 224 in the optical axis direction.

Reference numeral 232 designates a DC motor for rotating the drive ring 224 to thereby cause the first-group barrel 211 and the second-group barrel 212 to perform a zooming operation. The DC motor 232 is fixedly screwed to the cover barrel 227.

Reference numerals 241 and 242 designate photointerrupters. The photointerrupters 241 and 242 are fixed to the CCD holder 223. A light shielding plate, not shown, integrally formed with the second-group barrel 212 and a light shielding plate, not shown, integrally formed with the third-group barrel 213 move into or out of the gap parts of the respective photointerrupters 241 and 242.

Reference numeral 243 designates a photointerrupter fixed to the CCD holder 223. Reference numeral 244 designates a photointerrupter fixed to the cover barrel 227. A disk-shaped encoder plate 233a is fitted on the foot of a pinion 233 mounted to the foremost end of the output shaft of the DC motor 232. The encoder plate 233a has outer peripheral portions commonly used for being positioned in the gap parts of the respective photointerrupters 243 and 244, as shown in FIG. 15A.

The photointerrupters 243 and 244 are in a positional relationship in which the gap parts thereof partially overlap each other in the vertical direction, as viewed in FIG. 10, i.e. in the direction of extending of the rotating shaft of the DC motor 232. The vertical width of the overlap area, i.e. distance between the gap parts is larger than at least the thickness of the encoder plate 233a.

Figure 13:
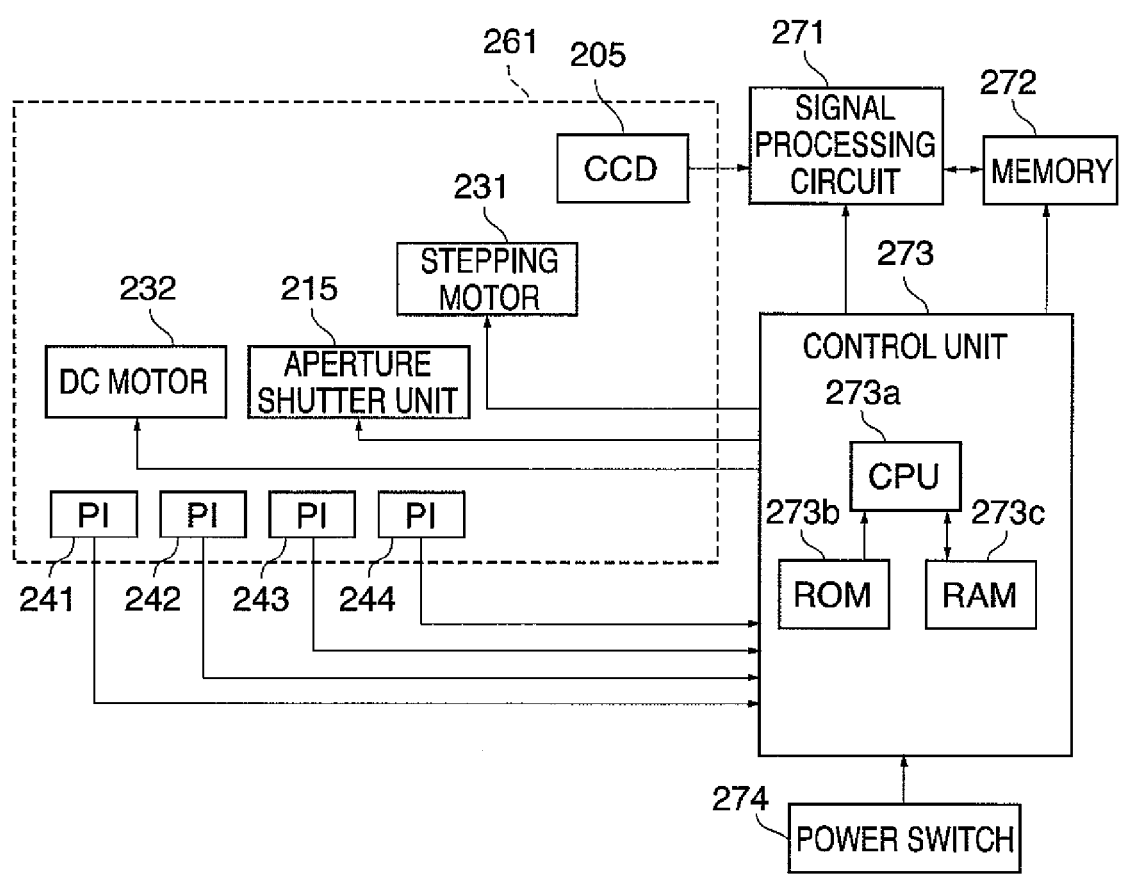
FIG. 13 is a block diagram showing the electrical arrangement of a camera using the lens barrel in FIG. 10.

FIG. 13 is a block diagram showing the electrical arrangement of a camera equipped with the lens barrel in FIGS. 10 to 12. The lens barrel 261 is the same as the lens barrel shown in FIGS. 10 to 12, and therefore component elements included in the lens barrel 261 are designated by the same reference numerals as used in FIGS. 10 to 12.

An image signal obtained through photoelectric conversion by the CCD 205 is subjected to predetermined signal processes, such as color conversion and gamma correction, by a signal processing circuit 271, and is then stored in a memory 272. The memory 272 is implemented by a card-shaped recording medium or the like. A control unit 273 controls the overall operation of the camera. The control unit 273 controls the DC motor 232, the stepping motor 231, and an aperture shutter unit 215, as required, while monitoring output signals from the respective photointerrupters (PI) 241, 242, 243, and 244 of the lens barrel 261. Further, the control unit 273 controls the above-mentioned signal processes and processing for memory access. A power switch 274 is capable of setting the power ON/OFF of the camera.

It should be noted that the control unit 273 is implemented by a microcomputer, and has a CPU 273a, a ROM 273b, and a RAM 273c. The ROM 273b stores various kinds of control programs including one corresponding to a flowchart in FIG. 18. The CPU 273a executes the control programs to thereby control various shooting processes of the present camera. In these control processes, the CPU 273a uses the RAM 273c as a work area and the like.

Next, a description will be given of the operation of the lens barrel 261. Torque of the DC motor 232 is transmitted to an outer peripheral gear 224a on the drive ring 224 via a gear system, not shown, to cause rotation of the drive ring 224.

The front end of the drive ring 224 is in contact with a flange 227a of the cover barrel 227, and the rear end of the drive ring 224 is in contact with a flange 222c formed on the rear end of the fixed barrel 222. With this construction, the movement of the drive ring 224 in the optical axis direction is restricted. Further, the drive ring 224 has an inner peripheral surface formed with three straight advance guide grooves 224b extending in the optical axis direction with a uniform width.

The movable cam ring 221 has three follower pins 221a erected on an outer periphery thereof, for being fitted in the three cam grooves 222a of the fixed barrel 222, respectively. A drive pin 221b is formed at a location approximately rearward of each follower pin 221a on the outer periphery of the movable cam ring 221. The drive pins 221b extend through three guide holes 222b formed in the sides of the fixed barrel 222, for being slidably fitted in the straight advance guide grooves 224b in the drive ring 224, respectively.

Therefore, when the drive ring 224 is rotated by the DC motor 232, torque thereof is transmitted to the movable cam ring 221 via the drive pins 221b fitted in the straight advance guide grooves 224b, whereby the movable cam ring 221 is moved in the optical axis direction while being rotated along the cam grooves 222a of the fixed barrel 222.

A protrusion 225a formed at a front end of the outer periphery of the straight advance guide ring 225 is in contact with the cam groove 221c formed in the inner periphery of the movable cam ring 221. Further, a flange 225b formed at a rear end of the straight advance guide ring 225 is in contact with the rear end of the movable cam ring 221, whereby the relative movement of the straight advance guide ring 225 with respect to the movable cam ring 221 in the optical axis direction is restricted.

A protrusion 225c formed at a rear end of the outer periphery of the straight advance guide ring 225 is fitted in a straight advance guide, not shown, formed in an inner peripheral surface of the fixed barrel 222 such that the protrusion 225c can advance straight, whereby the movement of the straight advance guide ring 25 in the direction of rotation is restricted. Therefore, when the movable cam ring 221 moves along the cam grooves 222a of the fixed barrel 222 while rotating, the straight advance guide ring 225 moves only in the optical axis direction in accordance with the movement of the movable cam ring 221 in the optical axis direction.

Formed in the outer peripheral surface of the straight advance guide ring 225 are straight advance guide grooves 225d and 225e having a predetermined width and extending in the optical axis direction. A guide 211a integrally formed with the first group barrel 211 is slidably fitted in the straight advance guide groove 225d. Further, a follower 212a of the second-group barrel 212 is slidably fitted in the straight advance guide groove 225e. Therefore, the rotations of the respective group barrels 211 and 212 are restricted. With this construction, as the movable cam ring 221 moves, the group barrels 211 and 212 move along the respective cam grooves 221d and 221e in the optical axis direction without being rotated.

Figure 14A:
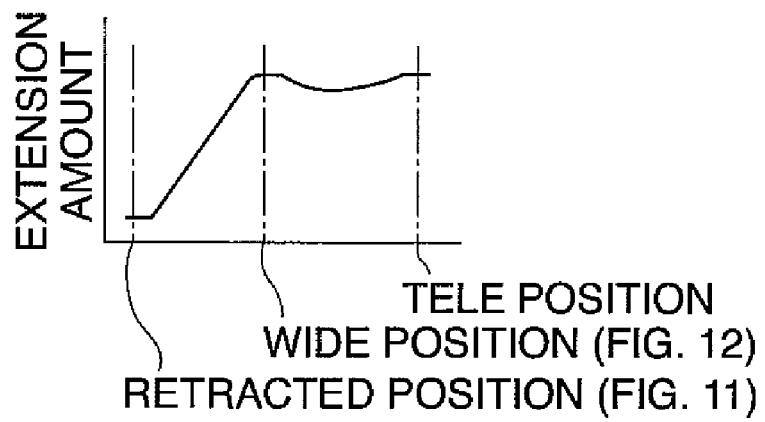
FIGS. 14A to 14E are conceptual diagrams useful in explaining the relationship between the path of each cam groove and change in the amount of extension of an associated barrel.
Figure 14B:
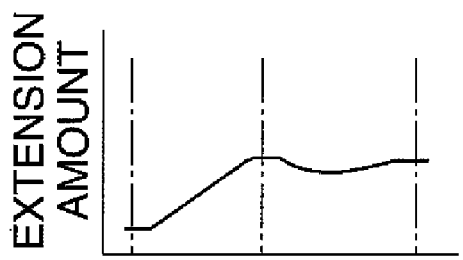
Figure 14C:
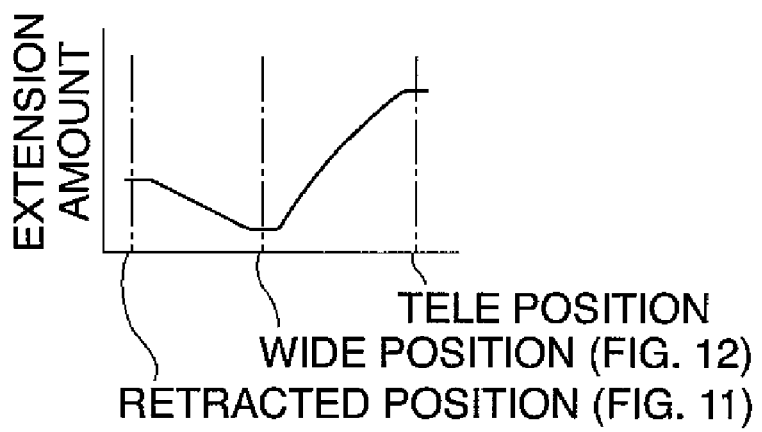

FIGS. 14A to 14E show the relationship between the path of each cam groove and change in the amount of extension of an associated barrel. FIG. 14A shows changes in the amount of extension of the movable cam ring 221 from the fixed barrel 222 along the cam grooves 222a of the fixed barrel 222. FIG. 14B shows changes in the amount of extension of the first-group barrel 211 from the movable cam ring 221 along the cam groove 221d of the movable cam ring 221. FIG. 14C shows changes in the amount of extension of the second-group barrel 212 from the movable cam ring 221 along the cam groove 221e of the movable cam ring 221.

Figure 14D:
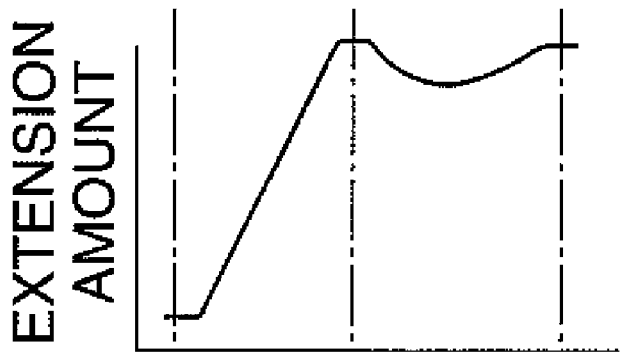
Figure 14E:
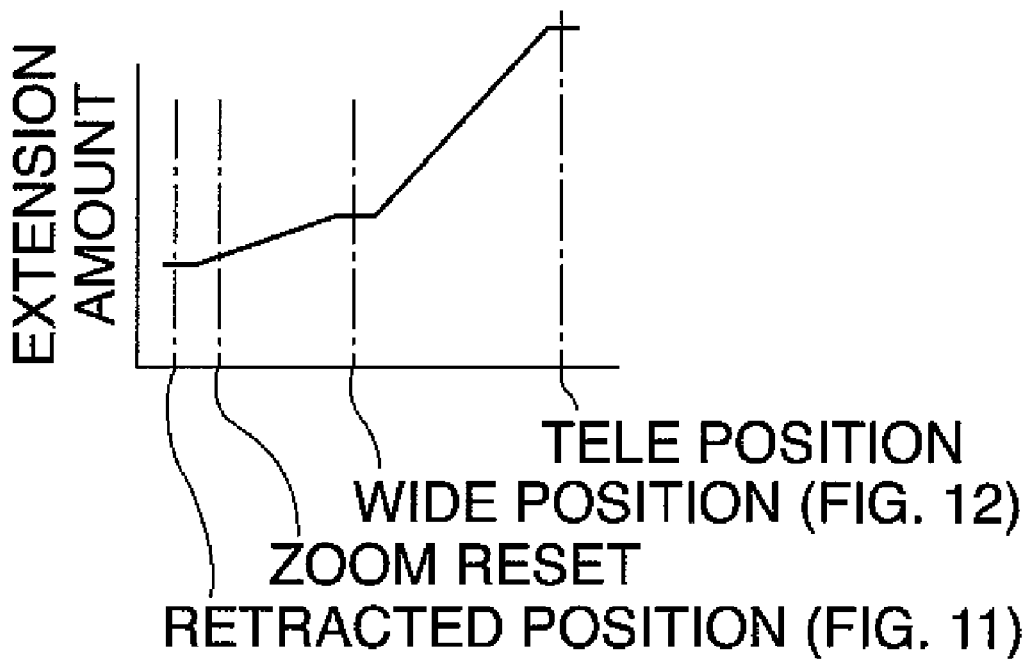

FIG. 14D shows changes in the amount of extension of the first-group barrel 211 from the fixed barrel 222. A change, shown in FIG. 14D, in the extension amount of the first-group barrel 211 is equal to the sum of a change, shown in FIG. 14A, in the amount of extension of the movable cam ring 221 from the fixed barrel 222 along the cam grooves 222a and a change, shown in FIG. 14B, in the amount of extension of the first-group barrel 211 from the movable cam ring 221 along the cam groove 221d. FIG. 14E shows changes in the amount of extension of the second-group barrel 212 from the fixed barrel 222. A change, shown in FIG. 14E, in the extension amount of the second-group barrel 212 is equal to the sum of the change, shown in FIG. 14A, in the amount of extension of the movable cam ring 221 from the fixed barrel 222 along the cam grooves 222a and a change, shown in FIG. 14C, in the amount of extension of the second-group barrel 212 from the movable cam ring 221 along the cam groove 221e.

The abscissa in each of FIGS. 14A to 14E represents positions in the optical axis direction, e.g. a retracted position, and a WIDE position and a TELE position each as a shooting position of an associated barrel extended from the retracted position. The ordinate represents the corresponding extension amount.

As can be understood from comparison between FIG. 14D and FIG. 14E, the amount of extension of the second-group barrel 212 from the movable cam ring 221 can become larger than the amount of extension of the first-group barrel 211 from the movable cam ring 221, so as to achieve a zooming function. However, the first-group barrel 211 and the second-group barrel 212 are driven by the same DC motor 232, and have movements thereof restricted by the respective cam grooves 221d and 221e, as described hereinbefore, and hence, rear-end collision of the second-group barrel 212 with the first-group barrel 211 cannot occur during extension of the lens barrel.

However, the second-group barrel 212 and the third-group barrel 213 are driven by the different motors, respectively, and hence, when the movement of the second-group barrel 212 is stopped e.g. by an external force, the third-group barrel 213 can collide with the rear end of the second-group barrel 212. Therefore, in the second embodiment, extension control for the lens barrel 261 is performed in a manner avoiding the rear-end collision of the third-group barrel 213 with the second-group barrel 212.

In the following, how to avoid the rear-end collision will be described in detail. The control unit 273 drives the DC motor 232 to thereby perform an operation for switching between the retracted position and the shooting position, and a zoom operation (WIDE to TELE) in a shooting range (use position).

At this time, the encoder plate 233a rotates in accordance with rotation of the DC motor 232, whereby pulse signals are output from the photointerrupters 243 and 244. The control unit 273 detects the intermediate position within an operation stroke range from the retracted position to the shooting position (WIDE position) based on the pulse signals. Then, the control unit 273 drivingly controls the DC motor 232 and the stepping motor 231 in a manner avoiding the rear-end collision of the third-group barrel 213 with the second-group barrel 212 by utilizing the detected intermediate position. This control will be described in detail hereinafter.

The first-group barrel 211 has a lens barrier mechanism 211c. When the first group barrel 211 is in the retracted position, the control unit 273 drives the lens barrier mechanism 211c by a cam member 223a mounted to the CCD holder 223 to block an optical path of a photographic optical system. An aperture shutter unit 215 is fixed to the second-group barrel 212. Therefore, the aperture shutter unit 215 moves in the optical axis direction in unison with the second-group barrel 212.

Next, a description will be given of the driving of the third lens group 203. The third lens group 203 is held by the third-group barrel 213, and the third-group barrel 213 is slidably held by a main guide shaft 229 disposed in parallel with the optical axis. In association with the main guide shaft 229, a sub guide shaft 223b parallel to the optical axis is provided on the CCD holder 223 such that the sub guide shaft 223b is located on a side approximately symmetrically opposite to the main guide shaft 229 with respect to the optical axis. A detent, not shown, of the third-group barrel 213 is slidably fitted on the sub guide shaft 223b.

Further, the third-group barrel 213 is formed with a nut-receiving part 213a which is C-shaped in cross section. A nut 234 is fitted in a C-shaped gap of the nut-receiving part 213a. The nut 234 is screwed onto a feed screw part 231a formed on the rotating shaft of the stepping motor 231. The rotation of the nut 234 is restricted by a detent 213b formed on the third-group barrel 213. Therefore, when the stepping motor 231 is driven, the nut 234 acts to cause the third-group barrel 213 to move in a screw feed direction of the feed screw part 231a.

The main guide shaft 229 has a root thereof fixed to the CCD holder 223, and a foremost end thereof positioned by the third-group cap 226. A light shielding plate, not shown, moves into or out of the gap part of the photointerrupter 242 within an operation stroke range of the third-group barrel 213. An output signal from the photointerrupter 242 changes as the light shielding plate 112c moves into or out of the gap part. In response thereto, the control unit 273 resets a counter for the stepping motor 231, described hereinafter.

FIG. 15A is a diagram showing the relationship between the DC motor 232 and the photointerrupters 243 and 244. The photointerrupters 243 and 244 are disposed at locations rotated through approximately 30 degrees from respective symmetrical locations with respect to the rotating shaft of the DC motor 232, i.e. with a space of 150 degrees therebetween. Disposed in the gap parts of the respective photointerrupters 243 and 244 is the outer periphery of the single encoder plate 233a fitted on the rotating shaft of the DC motor 232.

The encoder plate 233a is formed with three openings arranged in the direction of rotation at equal space intervals, i.e. angular intervals of 120 degrees. The width of each opening has an angle of 60 degrees in the direction of rotation. Therefore, when the DC motor 232 is rotated clockwise and counterclockwise from the FIG. 15A position as 0 degree, output signals from the respective photointerrupters 243 and 244 changes as shown in FIG. 15B.

More specifically, each of the photointerrupters 243 and 244 has an A/D conversion function and outputs a pulse signal as shown in FIG. 15B in accordance with rotation of the encoder plate 233a. As a consequence, the control unit 273 can calculate the positions of the first-group barrel 211 and the second-group barrel 212 based on the numbers of pulses of the pulse signals and per-pulse distances of travel of the respective first-group and second-group barrels 211 and 212. In this case, the control unit 273 compares manners of changes of the two pulse signals from the respective photointerrupters 243 and 244 to thereby determine the rotational direction of the DC motor 232. Then, the control unit 273 takes the rotational direction into consideration and calculates the positions of the first-group barrel 211 and the second-group barrel 212.

It should be noted that the control unit 273 can grasp the positions of the first-group barrel 211 and the second-group barrel 212 using a table associating the numbers of drive pulses and travel distances, instead of calculating positions whenever the first-group barrel 211 and the second-group barrel 212 move.

Figure 16:
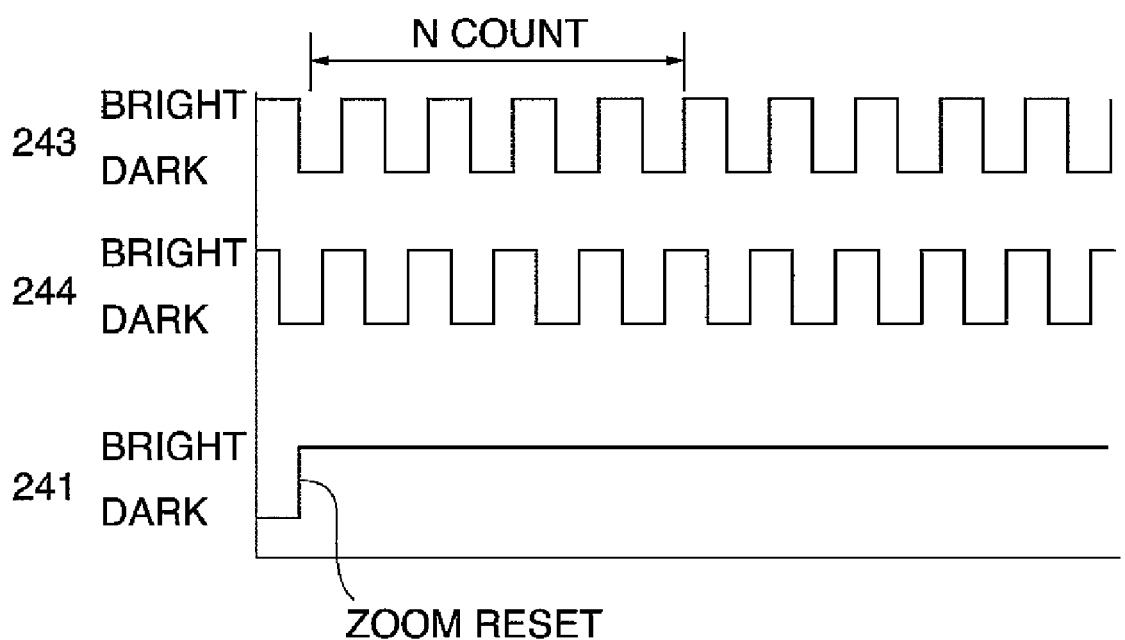
FIG. 16 is a diagram showing output signals output from respective photointerrupters during extension of the lens barrel.

FIG. 16 is a diagram showing the relationship between output signals output from the respective photointerrupters 241, 243, and 244 during extension of the lens barrel 261 from the retracted position to the shooting position (WIDE). When extension of the lens barrel 261 from the retracted position is started under the control of the control unit 273, the second-group barrel 212 is extended according to the extension amount shown in FIG. 14E, and the light shielding plate, not shown, moves out of the gap part of the photointerrupter 241. When the light shielding plate moves out, the output signal of the photointerrupter 241 is changed from "dark: L" to "bright: H".

The control unit 273 resets a zoom counter for the photointerrupters 243 and 244 in timing synchronous with switching of the output signal from the photointerrupter 241. This zoom counter is configured to count up by one whenever one pulse of the output signal is output from the photointerrupter 243.

Figure 17:
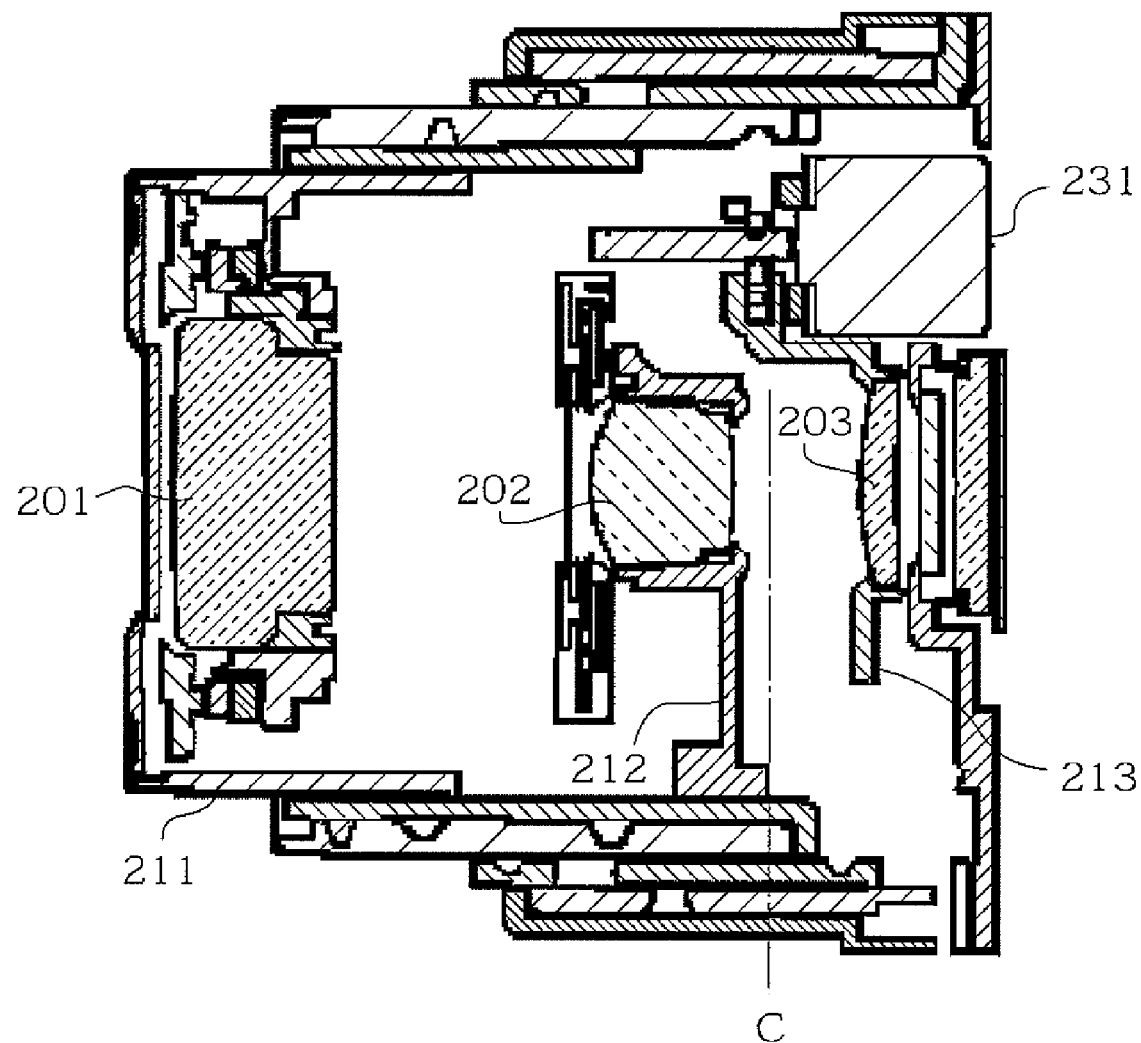
FIG. 17 is a cross-sectional view of the lens barrel (during extension).

Thereafter, the control unit 273 detects a position of the second-group barrel 212 when the count of the zoom counter becomes equal to "N" corresponding to approximately the half of a full extension stroke of the second-group barrel 212, as an intermediate position of the second-group barrel 212 during extension. FIG. 17 is a cross-sectional view of the lens barrel 261 in the intermediate position during extension.

When the intermediate position in FIG. 17 is detected, the control unit 273 starts extension of the third-group barrel 213 and extends the third-group barrel 213 to a position (position "C" in FIG. 17) where the rear-end collision of the third-group barrel 213 with the second-group barrel 212 cannot occur.

Figure 18:
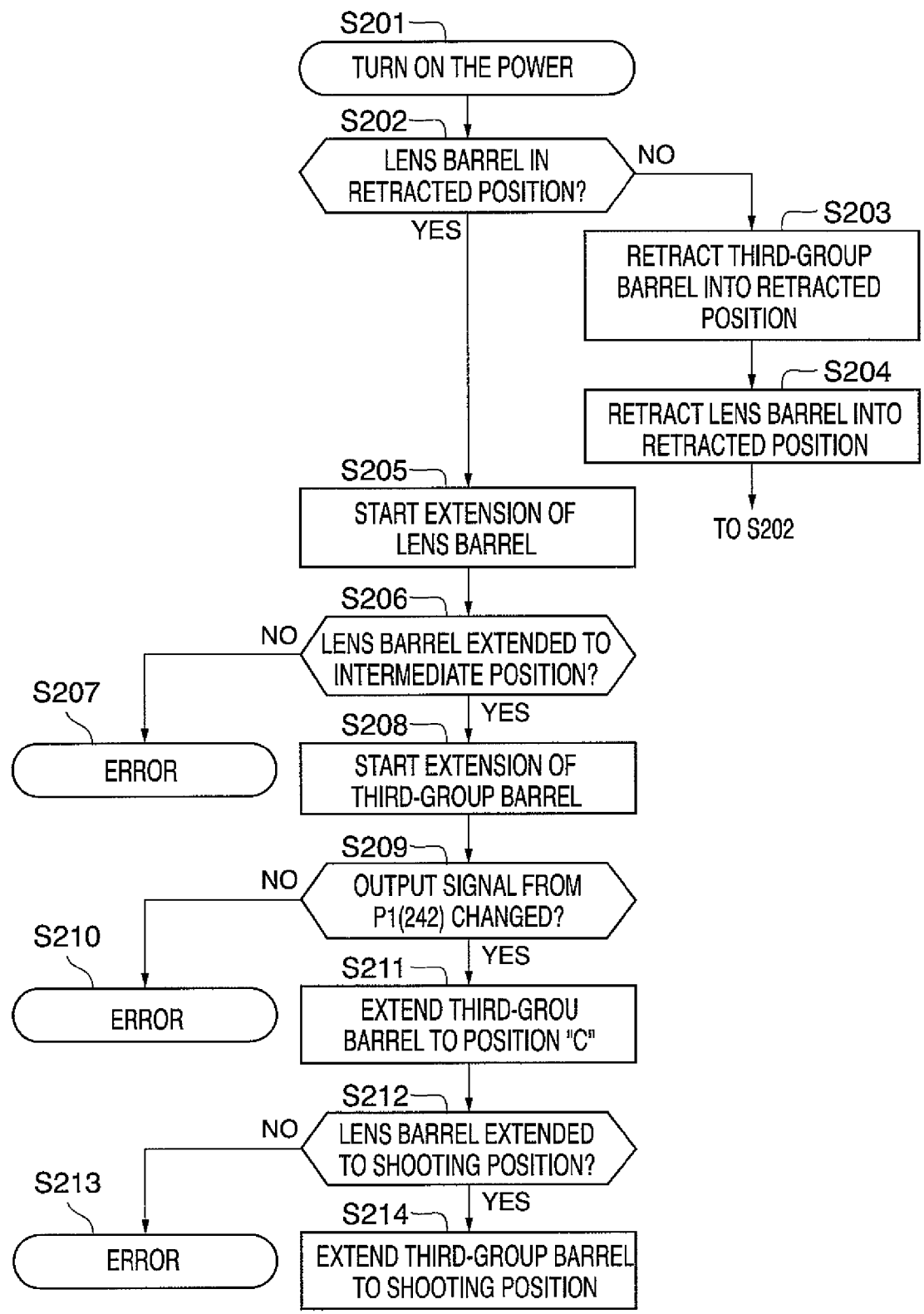
FIG. 18 is a flowchart of an extension process for extending the lens barrel.

FIG. 18 is a flowchart of an extension process for extending the first-group and second-group barrels 211 and 212 and the third-group barrel 213. The user operates the power SW (switch) 274 to turn on the power of the camera (S201). When the power is turned on, the control unit 273 determines, based on the output signal from the photointerrupter 241, whether or not the lens barrel 261 is in the retracted position (S202).

If the lens barrel 261 is not in the retracted position, the control unit 273 cannot calculate a travel distance (extension amount) of any of the first-group and second-group barrels 211 and 212 and the third-group barrel 213 from its current position to its extended position. In this case, first, the control unit 273 drives the stepping motor 231 to thereby retract the third-group barrel 213 into its retracted position so as to prevent collision between the second-group barrel 212 and the third-group barrel 213 (S203). Next, the control unit 273 drives the DC motor 232 to thereby retract the first-group and second-group barrels 211 and 212 into their retracted positions (S204), and then returns to the step S202.

On the other hand, if the lens barrel 261 is in the retracted position, the control unit 273 drives the DC motor 232 to thereby start extension of the first-group and second-group barrels 211 and 212 (S205). Then, the control unit 273 resets the zoom counter for the photointerrupters 243 and 244 in timing synchronous with switching of the output signal from the photointerrupter 241 (S206). Thereafter, the control unit 273 determines whether or not the count of the zoom counter has incremented, within a predetermined time period, to "N" corresponding to approximately the half of a full extension stroke of the second-group barrel 212, i.e. whether or not the second-group barrel 212 has been extended to its intermediate position (S206).

If it is determined that the count of the zoom counter has not been incremented to "N", the control unit 273 judges that an error has occurred, and executes error handling, such as warning display (S207). At this time, the control unit 273 stops driving the DC motor 232 to thereby stop the extension of the first-group and second-group barrels 211 and 212.

On the other hand, if it is determined that the count of the zoom counter has been incremented to "N", the control unit 273 drives the stepping motor 231 to thereby start extension of the third-group barrel 213 (S208). Then, the control unit 273 determines whether or not the output signal from the photointerrupter 242 has changed within a predetermined time period (S209). If it is determined that the output signal from the photointerrupter 242 has not changed within the predetermined time period, the control unit 273 judges that an error has occurred, and executes error handling, such as warning display (S210). At this time, the control unit 273 stops driving the DC motor 232 and the stepping motor 231 to thereby stop the extension of the first-group and second-group barrels 211 and 212 and the third-group barrel 213.

On the other hand, if it is determined that the output signal from the photointerrupter 242 has changed within the predetermined time period, the control unit 273 resets the counter for the stepping motor 231 (S211). In this case, the control unit 273 sets in the counter the number of pulses required for extending the third-group barrel 213 to the position "C" in FIG. 17, where the rear-end collision of the third-group barrel 213 with the second-group barrel 212 cannot occur (S211). Then, the control unit 273 applies drive pulses of a number corresponding to the drive pulse count set in the counter to the stepping motor 231 to thereby extend the third-group barrel 213 to the position "C" in FIG. 17 (S211).

After extending the third-group barrel 213 to the position "C" in the FIG. 17, the control unit 273 temporarily stops the operation for extending the third-group barrel 213. Since the second-group barrel 212 is being continuously extended from the intermediate position, the position "C" in FIG. 17 can be set at a location forward of the illustrated position. This makes it possible to further shorten time required for extending the entire lens barrel 261. However, in order to completely prevent collision of the third-group barrel 213 with the second-group barrel 212, it is required to give consideration to extending speeds of the respective second-group and third-group barrels 212 and 213.

Next, the control unit 273 determines, based on the count of the zoom counter, whether or not the first-group and second-group barrels 211 and 212 have been extended to their shooting positions (WIDE positions) within a predetermined time period (S212). If it is determined that the first-group and second-group barrels 211 and 212 have not been extended to their shooting positions, the control unit 273 judges that an error has occurred, and executes error handling, such as warning display (S213). At this time, the control unit 273 stops driving the DC motor 232 and the stepping motor 231 to thereby stop the extension of the first-group and second-group barrels 211 and 212 and the third-group barrel 213.

If it is determined that the first-group and second-group barrels 211 and 212 have been extended to their shooting positions (WIDE positions), the control unit 273 restarts driving the stepping motor 231 to thereby extend the third-group barrel 213 to its shooting position (S214). Thereafter, the control unit 273 awaits an instruction operation by the user, in the shooting-permitting state of the camera.

As described above, in the second embodiment as well, the intermediate position of an operation stroke of each of the first-group and second-group barrels 211 and 212 is detected during operation for extending the first-group and second-group barrels 211 and 212. Then, when the intermediate positions are detected, extension of the third-group barrel 213 positioned rearward of the second-group barrel 212 on the optical axis is started, and the third-group barrel 213 is extended to a position where the rear-end collision of the third-group barrel 213 with the second-group barrel 212 cannot occur.

This makes it possible to shorten time for extending the lens barrel from the retracted position as well as to prevent rear-end collision of the third-group barrel 213 with the second-group barrel 212 even when the operation for extending the second-group barrel 212 is stopped e.g. by a disturbance.

It should be noted that in the second embodiment, the intermediate position of the second-group barrel 212 is detected by counting the number of rotations of the DC motor as a drive source for an extending operation. This makes it easier to provide a plurality of intermediate positions than in the case in the first embodiment where the intermediate position of the first-group barrel 111 is detected as an absolute value, and therefore it is possible to easily avoid collision between barrels (lens units) adjacent to each other in the front-rear direction.

It should be noted that the sensor for detecting an intermediate position includes optical sensors other than gap-type and reflection-type photosensors, and other various kinds of sensors, such as a magnetic sensor, an ultrasonic sensor, and a pressure sensor.

It is to be understood that the present invention may also be accomplished by supplying a system or an apparatus with a storage medium in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-007417 filed Jan. 16, 2007, which is hereby incorporated by reference herein in its entirety.

What is claimed is:

1. An optical device comprising:
a first drive source;
a first lens unit configured to be driven by said first drive source;
a second drive source;
a second lens unit configured to be driven by said second drive source and provided rearward of said first lens unit on an optical axis;
a detecting unit configured to detect a reference position between a first reference position of said first lens unit and a second reference position forward of the first reference position; and
a control unit configured to control said first and second drive sources such that extension of said first lens unit forward from the first reference position is started, and after said reference position is detected by said detecting unit, extension of said second lens unit is started simultaneously with continued extension of sais first lens unit to said second reference position.

2. An optical device as claimed in claim 1, wherein each of said first lens unit and said second lens unit is movable between a retracted position thereof and a shooting position thereof.

3. An optical device as claimed in claim 1, wherein the first reference position is the retracted position of said first lens unit.

4. An optical device as claimed in claim 1, wherein the second reference position is the shooting position of said first lens unit.

5. An optical device as claimed in claim 1, wherein said control unit extends said second lens unit into a space which has been made empty by extension of said first lens unit therefrom.

6. An optical device as claimed in claim 1, wherein said control unit controls said second drive source such that extension of said second lens unit is temporarily stopped after said second lens unit is extended to a predetermined position.

7. An optical device as claimed in claim 6, wherein said control unit controls said first and second drive sources such that extension of said second lens unit is restarted after said first lens unit is extended to the second reference position.

8. A control method for an optical device having a first lens unit configured to be driven by a first drive source and a second lens unit configured to be driven by a second drive source and provided rearward of the first lens unit on an optical axis, comprising:
a detecting step of detecting a reference position between a first reference position of the first lens unit and a second reference position forward of the first reference position; and
a control step of controlling the first and second drive sources such that extension of the first lens unit forward from the first reference position is started, and after the reference position is detected in said detecting step, extension of the second lens unit is started while extension of said first lens group is continued to said second reference position.

9. A non-transitory computer-readable storage medium storing a control program that, when executed by a computer, causes the a computer to execute a control method for an optical device having a first lens unit configured to be driven by a first drive source and a second lens unit configured to be driven by a second drive source and provided rearward of the first lens unit on an optical axis, comprising:
a detecting module for detecting a reference position between a first reference position of the first lens unit and a second reference position forward of the first reference position; and
a control module for controlling the first and second drive sources such that extension of the first lens unit forward from the first reference position is started, and after the reference position is detected by said detecting module, extension of the second lens unit is started while extension of said first lens group is continued to said second reference position.

* * * * *